United States Patent [19]

Yamabe et al.

[11] Patent Number: 5,615,701
[45] Date of Patent: Apr. 1, 1997

[54] VACUUM VALVE CONTROL DEVICE AND VACUUM VALVE

[75] Inventors: Yasuo Yamabe, Shiga; Tetsushi Ohtsuka, Saitama, both of Japan

[73] Assignee: Sekisui Kagaku Kogyo Kabushiki Kaisha, Osaka, Japan

[21] Appl. No.: 255,716

[22] Filed: Jun. 7, 1994

[30] Foreign Application Priority Data

| Jun. 7, 1993 | [JP] | Japan | 5-135764 |
| Jun. 7, 1993 | [JP] | Japan | 5-135765 |
| Jun. 28, 1993 | [JP] | Japan | 5-157103 |
| Nov. 29, 1993 | [JP] | Japan | 5-297926 |
| May 24, 1994 | [JP] | Japan | 6-109820 |
| May 24, 1994 | [JP] | Japan | 6-109823 |

[51] Int. Cl.$^6$ ............... E03F 1/00; B65G 53/00; F16K 31/126
[52] U.S. Cl. .......... 137/205; 4/323; 137/236.1; 137/393; 137/396; 137/403; 141/65; 141/198; 406/14; 406/192
[58] Field of Search ............... 137/205, 236.1, 137/386, 393, 395, 403, 413, 414, 523, 846; 141/65, 198; 406/14, 15, 30, 50, 115, 192; 4/323

[56] References Cited

U.S. PATENT DOCUMENTS

| 3,763,862 | 10/1973 | Spieth | 251/61.1 |
| 4,251,048 | 2/1981 | Aurell | 251/61.1 |
| 5,069,243 | 12/1991 | Foreman | 137/393 |
| 5,078,174 | 1/1992 | Grooms et al. | 137/205 |

FOREIGN PATENT DOCUMENTS

| 0216101 | 4/1987 | European Pat. Off. . |
| 0415359 | 3/1991 | European Pat. Off. . |
| 2149534 | 6/1985 | United Kingdom . |
| 2215492 | 9/1989 | United Kingdom . |

*Primary Examiner*—George L. Walton
*Attorney, Agent, or Firm*—Sughrue, Mion, Zinn, Macpeak & Seas

[57] ABSTRACT

A vacuum control valve controls the removal of sewage or other liquid removed from a tank by a vacuum discharge pipe. The control valve uses the amount of liquid in the tank, the atmospheric pressure, and the vacuum pressure of the vacuum discharge pipe to open or close a pipe communicating section which attaches the vacuum discharge pipe to a suction pipe disposed within the tank. When the pipe communicating section is opened, the liquid is removed from the tank via the suction pipe and the vacuum discharge pipe. When the tank is emptied, a damping diaphragm allows for decompression of pressure around its peripheral portion to prevent excessive suction. An opening time adjusting valve automatically self-adjusts to control the time period for a single suction activity based on the vacuum pressure inside the vacuum discharge pipe.

11 Claims, 9 Drawing Sheets

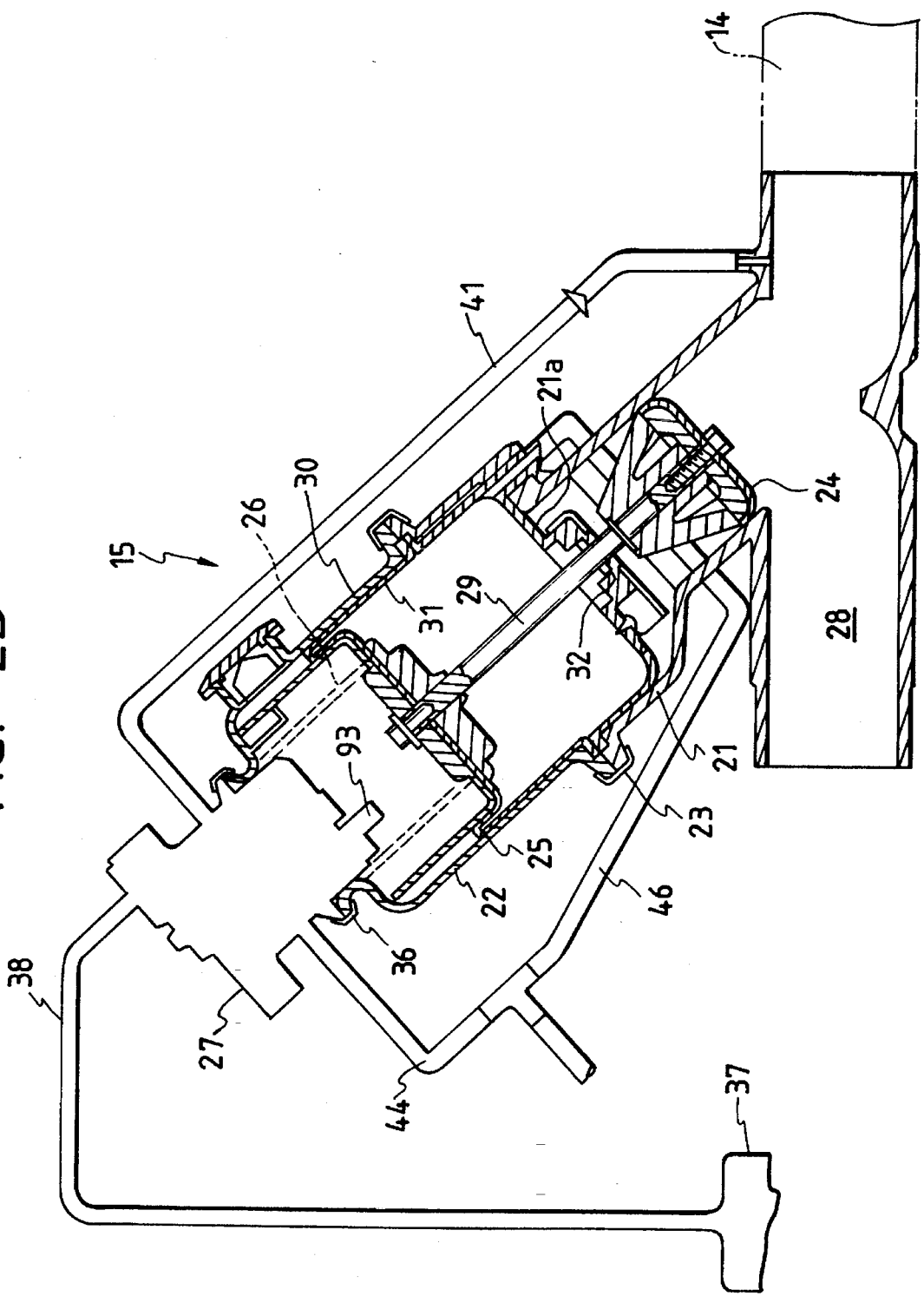

VACUUM VALVE CONTROL DEVICE AND VACUUM VALVE

BACKGROUND OF THE INVENTION

The present invention relates to a vacuum valve control device for a vacuum valve installed in a vacuum type sewage collection system or a vacuum type chemicals transporting apparatus, the valve body of which is driven by a pressure difference between vacuum and atmosphere. More particularly, the present invention relates to a vacuum valve control device for controlling vacuum used for opening and closing the valve body.

Usually, sewage discharged from every home flows to a sewage disposal plant by the action of natural flow. However, in this natural flow type sewage collection system, the construction of sewer pipes is restricted by geography and the condition of ground, and further the drain tends to be stopped up. For this reason, recently, attention has been given to a vacuum type sewage collection system in which sewage discharged from every home is forcibly transported by the action of vacuum.

This vacuum type sewage collection system includes: a vacuum valve unit in which sewage discharged from each home is stored when it flows by the action of natural flow; and a vacuum station by which sewage is collected from the vacuum valve unit through a vacuum pipe.

A vacuum valve unit is disclosed, for example, in U.S. Pat. No. 5,069,243. The vacuum valve unit disclosed in the above patent includes: a suction pipe, one end of which is dipped in sewage in the sewage tank; a vacuum valve, the pipe-shaped communicating portion of which is connected with the other end of the suction pipe; and a vacuum discharge pipe connected with the communicating portion, wherein this vacuum discharge pipe is connected with a vacuum pump disposed in a vacuum station through a vacuum pipe. In the vacuum valve, the pipe-shaped communicating portion can be opened and closed when a valve body disposed in the pipe-shaped communicating portion is operated. The vacuum pipe is maintained to be in a vacuum condition at all times by the action of the vacuum pump through the vacuum pipe. When a predetermined amount of sewage is stored in the sewage tank, the valve body of the vacuum valve is opened by a pressure difference between the vacuum in the vacuum discharge pipe and the atmosphere, so that the pipe-shaped communicating portion can be opened. Due to the foregoing, the vacuum discharge pipe in a vacuum condition is communicated with the suction pipe, so that sewage in the sewage tank is sucked into the vacuum discharge pipe by the action of vacuum, and transported to the vacuum station through the vacuum pipe.

The valve body disposed in the communicating portion of the vacuum valve usually closes the communicating portion. When the valve operating chamber is put into a vacuum condition, the valve body is pulled so that the communicating portion can be opened. The vacuum condition in the valve operating chamber is controlled by the vacuum valve control device.

This vacuum valve control device is connected with a liquid level detecting pipe, the lower end of which is dipped in the sewage in the sewage tank. When the liquid level of sewage is changed, the pressure in the liquid level detecting pipe is changed, so that a liquid level detecting diaphragm provided in the vacuum valve control device is resiliently deformed. Due to the deformation of the liquid detecting diaphragm, a detecting valve for introducing a vacuum into the vacuum valve control device is operated. Therefore, vacuum is activated on a changeover valve disposed in the vacuum control valve. Due to the foregoing, the changeover valve can be changed over, so that the vacuum discharge pipe is communicated with the valve operating chamber of the vacuum valve. Accordingly, this valve operating chamber is put in a vacuum condition. When the valve operating chamber is put in a vacuum condition, the valve body is pulled, and the communicating portion is opened.

As a result of the foregoing, the vacuum discharge pipe in a vacuum condition is communicated with the suction pipe, so that the inside of the suction pipe is also put in a vacuum condition. Accordingly, sewage in the sewage tank is quickly sucked into the suction pipe and vacuum discharge pipe. Then the sewage is transported into a sewage collection tank in the vacuum station through the vacuum pipe.

When sewage in the sewage tank is sucked in a moment, the liquid level detecting diaphragm of the vacuum valve control device gradually returns to the original condition. Due to the foregoing, the operation of the detecting valve is released, and the communication between the inside of the vacuum valve control device and the vacuum discharge pipe is intercepted, and at the same time the atmosphere is introduced into the vacuum valve control device. Then the changeover valve is changed over, so that the atmosphere is introduced into the valve operating chamber of the vacuum valve.

According to above mentioned U.S. Pat. No. 5,069,243, a damping mechanism is provided, by which the liquid level detecting diaphragm is prevented from being resiliently deformed in the case where sewage in the sewage tank is discharged by the vacuum discharge pipe and the resilient deformation of the liquid level detecting diaphragm is released. This damping diaphragm includes: a pressure adjusting chamber provided between the liquid level detecting pipe and the liquid level detecting diaphragm; and a damping diaphragm provided between the pressure adjusting chamber and the liquid level detecting diaphragm.

A minute through-hole is formed on this damping diaphragm so that the damping diaphragm is not deformed when the pressure in the liquid level detecting pipe is gradually increased. Therefore, the damping diaphragm is not resiliently deformed by an increase of pressure in the liquid level detecting pipe in the case where sewage is stored in the sewage tank. On the other hand, in the case where the liquid level detecting diaphragm is resiliently deformed after sewage in the sewage tank has been discharged and the resilient deformation of the liquid level detecting diaphragm has been released, the damping diaphragm is resiliently deformed, so that the communication between the pressure adjusting chamber and the liquid level detecting diaphragm is intercepted. As a result, the liquid level detecting diaphragm is prevented from being resiliently deformed. Therefore, there is no possibility that the detecting valve is activated again, and there is no possibility that the vacuum valve is opened.

In the vacuum sewage collecting apparatus described above, sewage in the sewage tank is sucked and discharged in a moment. Therefore, the liquid level of the sewage tank is suddenly lowered. As a result, the liquid level of the liquid level detecting pipe is also lowered so that the pressure in the liquid level detecting pipe is also suddenly lowered. However, as described above, since the damping diaphragm is provided between the liquid level detecting pipe and the pressure adjusting chamber, the pressure in the pressure adjusting chamber is released only through a minute through-hole when the pressure in the liquid detecting pipe is lowered. Therefore, it takes time to cancel the resilient deformation of the liquid level detecting diaphragm. As a result, even when sewage in the sewage tank is discharged, an excessive amount of air is sucked and the degree of vacuum is lowered.

Further, in the vacuum valve control device, the vacuum force introduced into the pressure control chamber is released to the atmosphere by a needle valve.

However, in the conventional vacuum type sewage collecting system, as illustrated in FIG. 5, at a distant place from the vacuum station 2 for collecting sewage into the sewage collecting tank 1, the vacuum is lowered by the saw-tooth lift 4 provided in the vacuum pipe line 3. Therefore, in the case of an opening time adjusting mechanism having a needle valve provided in the controller of a conventional vacuum valve, the needle valves are respectively adjusted at adjacent and distant places in such a manner that the opening time of a vacuum valve located at a distant place is set longer so that an air/liquid ratio in the pipe line can be maintained in a particular range (disclosed in Japanese Unexamined Patent Publication (Kokai) Hei-2-292427). In the case where the vacuum valves are simultaneously opened, vacuum in the vacuum discharge pipe is lowered. When this condition frequently occurs, a sufficient amount of air is not supplied into the vacuum pipe line, so that a water plug grows in the lift portion, and the entire system is in trouble.

Furthermore, between an outer circumferential surface provided in the housing of the vacuum valve and an inner circumferential surface of the housing, a rolling diaphragm is disposed, by which the valve operating chamber in the housing is airtightly isolated. This rolling diaphragm is made of resilient rubber, and bent between the outer circumferential surface of the plunger and the inner circumferential surface of the housing so that the rolling diaphragm can be closely brought into contact with the outer circumferential surface of the plunger and the inner circumferential surface of the housing. In the case where the plunger is slid by the action of vacuum in the valve operating chamber in the housing, the rolling diaphragm is deformed so that the bent portion is moved in a sliding direction of the plunger. As described above, while a volume in the valve operating chamber is not changed, the plunger can be positively slid by the action of the rolling diaphragm when vacuum is activated.

Usually, a portion close to the bent portion of the rolling diaphragm is not closely contacted with the inner circumferential surface of the housing, but the portion is contacted with the rolling diaphragm which is closely contacted with the outer circumferential surface of the plunger. When one portion of the rolling diaphragm is contacted with another portion with pressure as described above, there is a possibility that the contacting portion is rubbed and worn away in the case where the contacting portion is moved in accordance with the sliding movement of the plunger. When the rolling diaphragm is worn away, there is a possibility that airtightness of the rolling diaphragm is deteriorated. When airtightness of the rolling diaphragm is deteriorated, airtightness of the valve operating chamber can not be maintained, and the plunger can not be driven even when the valve operating chamber is put in a vacuum condition.

Therefore, in order to suppress the abrasion of the rolling diaphragm, a method is put into practical use, in which a surface of the rolling diaphragm is coated with lubricant such as silicon grease or silicon oil. However, the coated lubricant permeates into the rolling diaphragm made of resilient material, so that the effect of the lubricant can not be exerted over a long period of time. For this reason, the rolling diaphragm must be replaced in a short period of time.

SUMMARY OF THE INVENTION

The present invention solves the above problems. It is an object of the present invention to provide a vacuum valve control device by which the vacuum valve can be quickly closed even after sewage in the sewage tank has been discharged by the action of vacuum.

It is another object of the present invention to operate a vacuum valve at an appropriate opening time in accordance with the vacuum in a vacuum discharge pipe so that an air/liquid ratio in the pipe line can be maintained in a predetermined range, and a vacuum type liquid collecting/transporting apparatus can be stably operated.

It is a further object of the present invention to provide a vacuum valve in which the rolling diaphragm for airtightly separating the valve operating chamber can be stably used over a long period of time.

In order to accomplish the above object, the present invention provides a vacuum valve control device provided in a vacuum valve which opens and closes with a vacuum a pipe-shaped connecting section for connecting a vacuum discharge pipe in a vacuum condition with a suction pipe for sucking liquid in a tank, the vacuum valve control device controlling the opening and closing operations of the vacuum valve, with the vacuum valve control device comprising: liquid level detecting pipe section, the inside pressure of which fluctuates in accordance with the fluctuation of a liquid level in the tank; a pressure adjusting chamber communicating with the liquid level detecting pipe section; a liquid level detecting diaphragm resiliently deformed when the pressure in the pressure adjusting chamber is activated on the diaphragm through a communicating hole; a changeover valve which change over by the action of a vacuum so that vacuum or atmosphere can be selectively supplied to the vacuum valve; a detection valve for controlling the supply and stop of vacuum to the changeover valve; a plunger for changing over the detection valve which is driven by the resilient deformation of the liquid level detecting diaphragm; and a damping diaphragm disposed between the liquid level detecting pipe section and the pressure adjusting chamber, with the damping diaphragm having at least one small through-hole so that the damping diaphragm is not resiliently deformed when the pressure in the liquid level detecting pipe section is gradually increased, wherein the damping diaphragm is resiliently deformed by the decompression of the pressure adjusting chamber so that a communicating hole formed between the pressure adjusting chamber and the liquid level detecting diaphragm can be closed. The damping diaphragm is capable of releasing the pressure from its peripheral portion into the liquid level detecting pipe section when the pressure in the pressure adjusting chamber is suddenly increased.

The present invention is to provide a vacuum valve for opening and closing a communicating section between a suction pipe communicated with a tank, and a vacuum discharge pipe communicated with a vacuum source, the vacuum valve comprising: a valve body for opening and closing the communicating section; a valve operating chamber for accommodating a plunger connected with the valve body; a closing force providing means for providing a closing force to the valve body accommodated in the valve operating chamber; and a controller for providing an opening force to the valve body by impressing a vacuum upon the valve operating chamber. The controller includes a changeover valve capable of changing over between a vacuum passage and an atmospheric passage in the valve operating chamber, a liquid level detecting diaphragm operated to a liquid level in a tank, a pressure control chamber providing a vacuum force to the changeover valve so that the vacuum passage can be connected with the valve operating chamber, a detecting valve provided in the pressure control chamber, with the detecting valve being capable of introducing a vacuum force into the pressure control chamber, a plunger directly driven by the liquid level detecting diaphragm, with the plunger being inserted into the pressure control chamber so as to drive the detecting valve, and an opening time adjusting valve to be opened so that a vacuum force introduced into the pressure control chamber can be released. The opening time is automatically controlled by a vacuum in the vacuum discharge pipe.

Furthermore, according to the present invention, the rolling diaphragm is resilient so that it can be deformed in accordance with the movement of the plunger. The rolling diaphragm contains a lubricant so that the lubricant can ooze out from the surface of the rolling diaphragm. Furthermore, the rolling diaphragm includes a large diameter section formed at one end capable of coming into pressure contact with the inner surface of the valve operating chamber in a free condition before assembly, a small diameter section formed at its other end capable of coming into pressure contact with the outer surface of the plunger, and a tapered section formed in the middle between these large and small diameter sections.

In the vacuum valve control device of the present invention, when the pressure in the liquid level detecting pipe is increased in accordance with an increase of the liquid level in the tank, the pressure in the pressure adjusting chamber is increased without resilient deformation of the damping diaphragm, so that the liquid level detecting diaphragm is resiliently deformed. Due to the resilient deformation of the liquid level detecting diaphragm, the plunger is driven, the detecting valve is operated, and the changeover valve is put in a vacuum condition. When the changeover valve is put in a vacuum condition, the changeover valve is operated, and the inside of the vacuum valve is put in a vacuum condition, so that the vacuum valve is opened. As a result, the communicating portion between the suction pipe in the tank and the vacuum discharge pipe is opened, and the suction pipe is put in a vacuum condition, so that sewage in the tank is discharged through the suction pipe and the vacuum discharge pipe by the action of a vacuum.

When the liquid level in the tank is lowered, pressure in the liquid level detecting pipe is lowered, and pressure in the pressure adjusting chamber is quickly released through the periphery of the damping diaphragm. Therefore, the resilient deformation of the liquid level detection diaphragm is quickly canceled. Due to the foregoing, the operation of the detecting valve conducted by the plunger is stopped, and the changeover valve is operated so that the atmosphere can be introduced into the vacuum valve, and then the vacuum valve is closed by the action of the introduced atmosphere.

When the liquid level detecting diaphragm is resiliently deformed in the case where the resilient deformation of the liquid level detecting diaphragm is canceled, the pressure adjusting chamber is put in a decompressed condition, and the damping diaphragm is resiliently deformed, so that the communicating portion with the liquid level detecting diaphragm is closed. Due to the foregoing, the liquid level detecting diaphragm can be prevented from being resiliently deformed. Accordingly, there is no possibility that the detecting valve is operated again.

Furthermore, when a valve lift of the opening time adjusting valve is automatically controlled in accordance with the vacuum transmitted from the vacuum discharge pipe, (a) the higher the vacuum is, the larger the valve lift of the opening time adjusting valve is increased, so that the vacuum valve is closed in a short period of time, and (b) the lower the vacuum is, the smaller the valve lift of the opening time adjusting valve is decreased, so that the vacuum valve is opened over a long period of time. Due to the foregoing, an air/liquid ratio in the pipe line can be maintained in a predetermined range, and the vacuum type liquid collecting/transporting apparatus can be stably operated.

Moreover, in the vacuum valve of the present invention, the rolling diaphragm for separating the valve operating chamber in the housing contains a lubricant, so that the lubricant successively oozes out from the surface of the rolling diaphragm. The lubricant that has oozed out from the surface of the rolling diaphragm suppresses the abrasion of the rolling diaphragm in the case where a portion of the diaphragm close to the bent portion is rubbed when the plunger moves in the valve operating chamber. Furthermore, under a free condition before assembly, one end portion of the rolling diaphragm is made to be a large diameter portion, the other end portion is made to be a small diameter portion, and the middle portion is made to be a tapered portion. Accordingly, when the rolling diaphragm is used, the folded surfaces in the intermediate bent portion of the rolling diaphragm are not contacted with each other, so that abrasion is not caused by rubbing.

BRIEF DESCRIPTION OF THE DRAWINGS

FIGS. 2A and 2B are longitudinal sectional view of the vacuum valve;

DETAILED DESCRIPTION OF PREFERRED EMBODIMENTS

First Embodiment

With reference to the accompanying drawings, a first embodiment of the present invention will be explained as follows.

Figure 1:
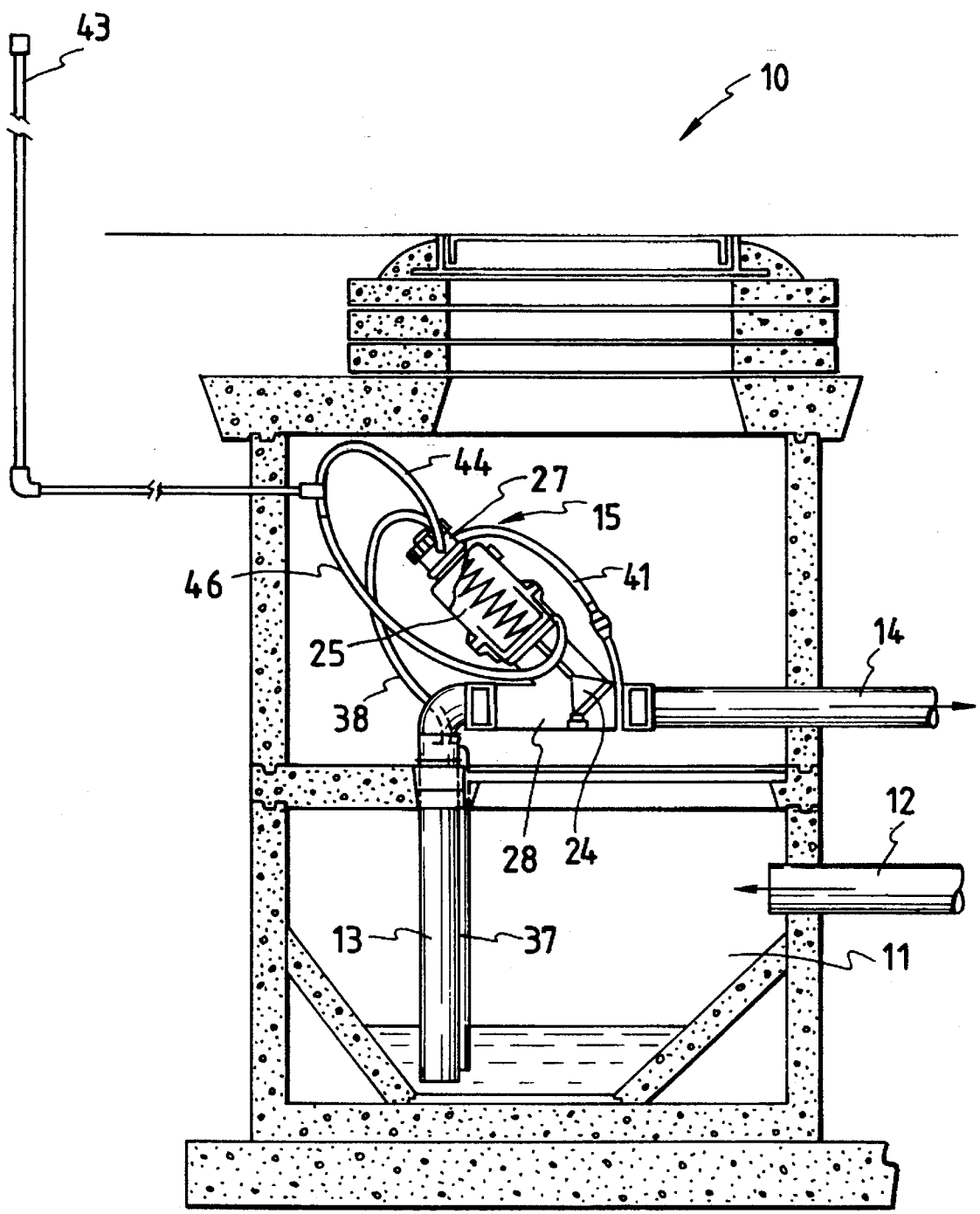
FIG. 1 is a sectional views of the vacuum type sewage collecting apparatus showing a using condition of the vacuum valve having the vacuum valve control device of the present invention.

FIG. 1 is a sectional view showing an outline of the vacuum type sewage collecting apparatus to which a vacuum valve having the vacuum valve controlling device of the present invention is applied. This vacuum type sewage collecting apparatus 10 is provided for collecting sewage discharged from every home by a natural flow. When a predetermined amount of sewage has been collected into a sewage tank 11 of the vacuum type sewage collecting apparatus 10, the sewage is transported to a sewage collecting tank in a vacuum station in which a vacuum pump is installed. Sewage transported to the sewage collecting tank is transported to a sewage disposal plant by a pump.

A sewage inflow pipe 12 in which sewage flows from every home by the natural flow is connected with the sewage tank 11 of the vacuum type sewage collecting apparatus 10. In the sewage tank 11, a suction pipe 13 is vertically disposed, through which sewage stored in the sewage tank 11 is sucked. One of the ends of a pipe-shaped communicating section 28 including a valve body 24 of a vacuum valve 15 is horizontally connected with an upper end of this suction pipe 13. A vacuum discharge pipe 14 is horizontally connected with the other end of the communicating section 28. The communicating section 28 is opened and closed by the valve body 24 of the vacuum valve 15, wherein the valve body 24 is disposed inside the communicating section 28.

The vacuum discharge pipe 14 is connected to the vacuum station through a vacuum pipe. The inside of the vacuum discharge pipe 14 and that of the vacuum pipe are maintained in a vacuum condition at all times by the vacuum pump disposed in the vacuum station. Consequently, when the communicating section 28 is opened, the vacuum discharge pipe 14 is communicated with the suction pipe 13, so that sewage in the sewage tank 11 is sucked into the suction pipe 13 and quickly transported to the sewage collecting tank in the vacuum station by the action of vacuum in the communicating section 28 and the vacuum discharge pipe 14.

A liquid level detecting pipe 37 is vertically provided in the sewage tank 11, and a lower end of the liquid level detecting pipe 37 is dipped in the sewage stored in the sewage tank 11. This liquid level detecting pipe 37 communicates with the inside of a vacuum valve control device 27 provided in the vacuum valve 15 through a flexible hose 38. Therefore, a change in pressure caused by the fluctuation of the liquid level in the sewage tank 11 can be transmitted to the vacuum valve control device 27. The vacuum valve control device 27 controls the vacuum in a valve operating chamber 25 in the vacuum valve 15 in accordance with a change in the liquid level of sewage in the sewage tank 11 detected by the liquid level detecting pipe 37.

The inside of the vacuum discharge pipe 14 communicates with the vacuum valve control device 27 through a flexible hose 41, so that the vacuum condition in the vacuum discharge pipe 14 is transmitted to the vacuum valve control device 27. Further, an atmosphere communicating pipe 43 communicates with the vacuum valve control device 27 through a flexible hose 44. An upper end of this atmosphere communicating pipe 43 is open to the atmospheric pressure on the ground surface. Accordingly, atmosphere introduced from the atmosphere communicating pipe 43 is introduced to the inside of the vacuum valve control device 27 through the flexible hose 44. This atmosphere communicating pipe 43 also communicates with the valve operating chamber 25 of the vacuum valve 15 through a flexible hose 46.

Figure 2A:
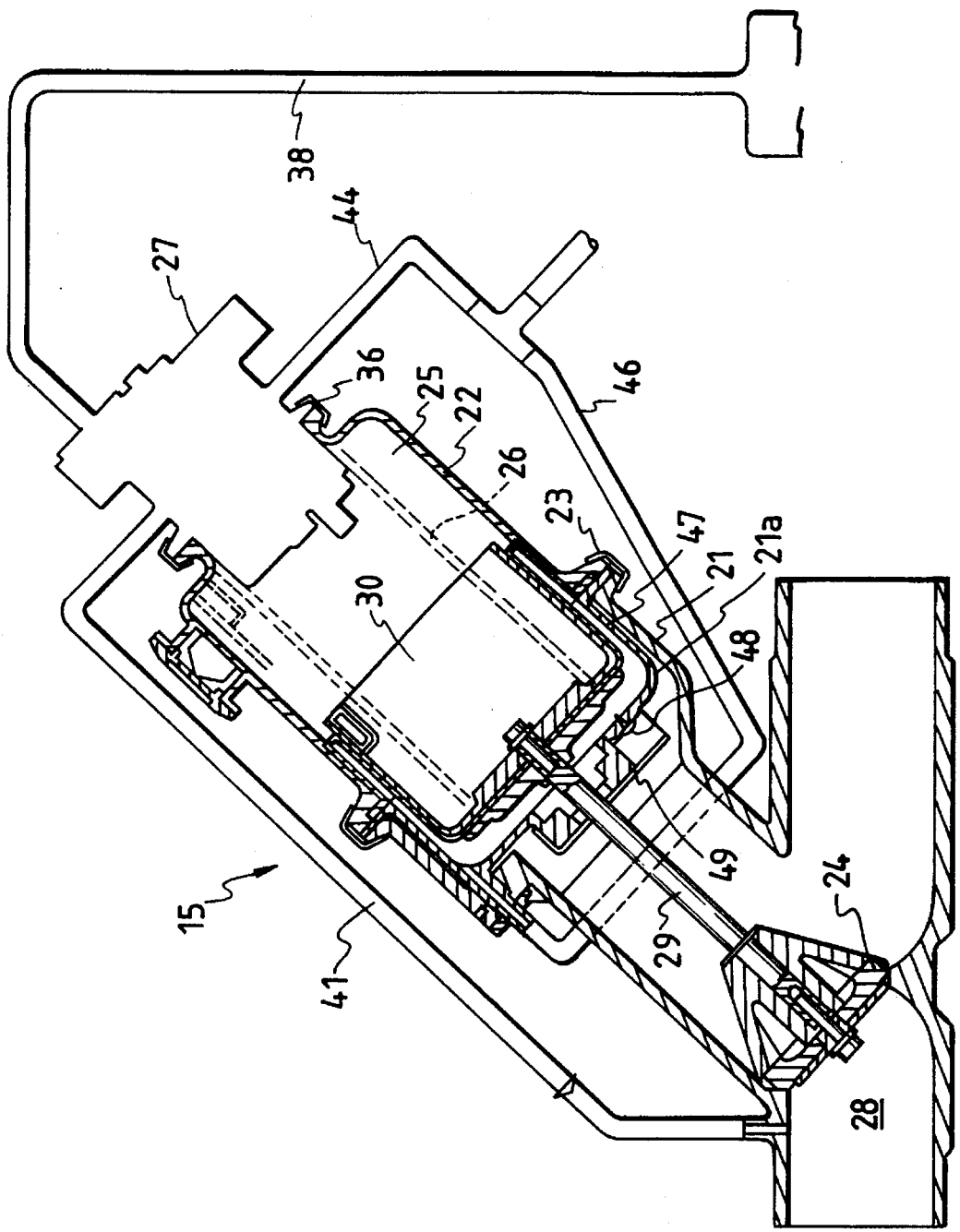

FIGS. 2A and 2B are longitudinal sectional views of the vacuum valve 15. This vacuum valve 15 includes: a first cylindrical housing 21 integrated with the communicating section 28 in which the valve body 24 is provided, wherein the first cylindrical housing 21 communicates with the inside of the communicating section 28; and a second cylindrical housing 22 connected with the upper portion of the first housing 21 through a band cramp 23. In this case, the first housing 21 is disposed to form an angle of 45° with respect to the communicating section 28, which is horizontally disposed. The inside of the first housing 21 is divided into an upper and a lower portion by a bulkhead 21a, and the valve operating chamber 25 is disposed on the upper side of this bulkhead 21a.

A valve rod 29 penetrates the center of the bulkhead 21a, and a valve body 24 for opening and closing the communicating section 28 is attached to the lower end of this valve rod 29. The upper end of the valve rod 29 is disposed in the valve operating chamber 25, and attached to the bottom surface of a cylindrical plunger 30, the upper surface of which is open. This plunger 30 is slidably provided in the valve operating chamber 25, and pushed by a push spring 26 provided in the valve operating chamber 25 so that the valve body 24 can close the communicating section 28.

Figure 10A:
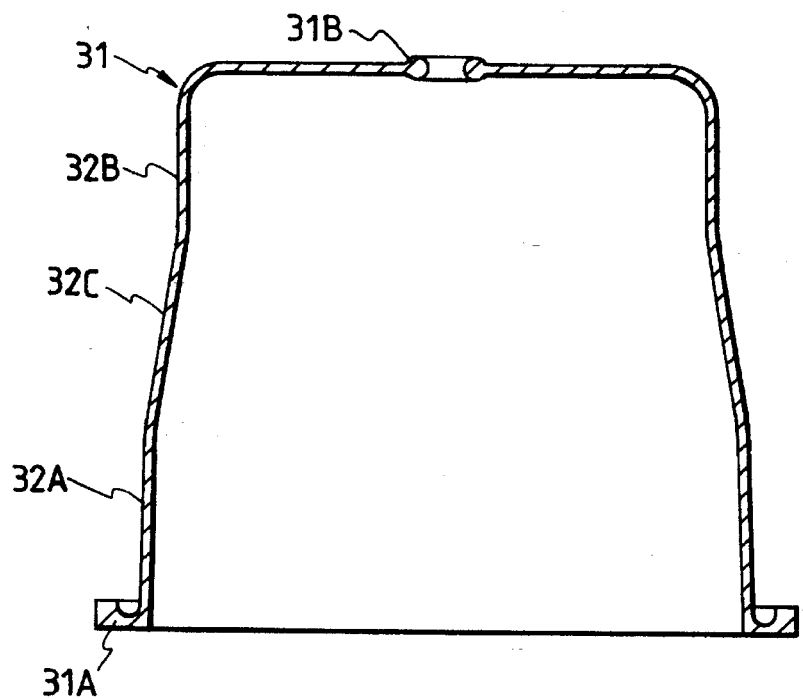
FIGS. 10A and 10B are sectional views showing the rolling diaphragm before and after the assembly of the rolling diaphragm.
Figure 10B:
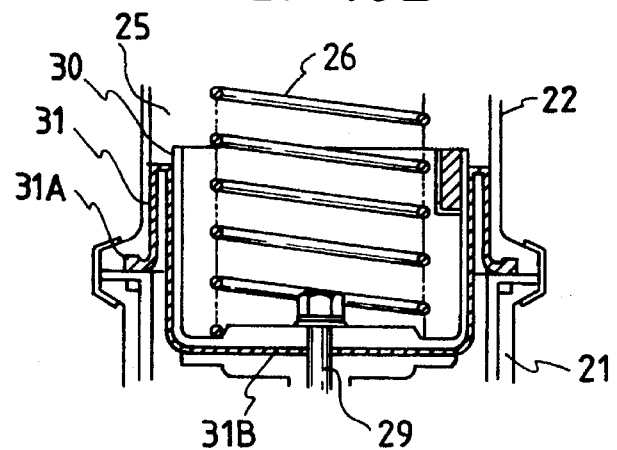

A resilient rolling diaphragm 31 (as shown in FIG. 10b) is provided between the first and second housings 21, 22. This rolling diaphragm 31 is fixed under the condition that the periphery of the rolling diaphragm 31 is placed between the first and second housings 21, 22. A portion close to the outer periphery of the rolling diaphragm 31 comes into close contact with the inner circumferential surface of the second housing 22. Further, a central side portion of the rolling diaphragm 31 close to the inner side of a portion coming into contact with the inner circumferential surface of the second housing 22, bent by an angle of 360°. A portion close to the inside of the bent portion comes into closer contact with the side surface of the plunger 30, and further a central portion on the inside of that portion comes into close contact with the bottom surface of the plunger 30. The valve rod 29 penetrates the center of the rolling diaphragm 31 covering the bottom surface of the plunger 30.

The vacuum valve control device 27 of the present invention is disposed at an upper end of the second housing 22. This vacuum valve control device 27 is engaged and connected with the upper end of the second housing 22 through a band cramp 36. This vacuum valve control device 27 is operated as follows. When the amount of sewage in the sewage tank 11 is increased and the pressure in the liquid level detecting pipe 37 is raised, the valve operating chamber 25 is put in a vacuum condition, the plunger 30 is pushed, and the valve body is pulled against a force of the spring 26, so that the valve body can open the communicating section 28. When the valve body 24 is pulled, the communicating section 28 is opened, and then the vacuum discharge pipe 14 and the suction pipe 13 are put in a communicating condition. Therefore, sewage in the sewage tank 11 is transported through the vacuum discharge pipe 14 by the action of vacuum activated in the vacuum discharge pipe 14.

Figure 3:
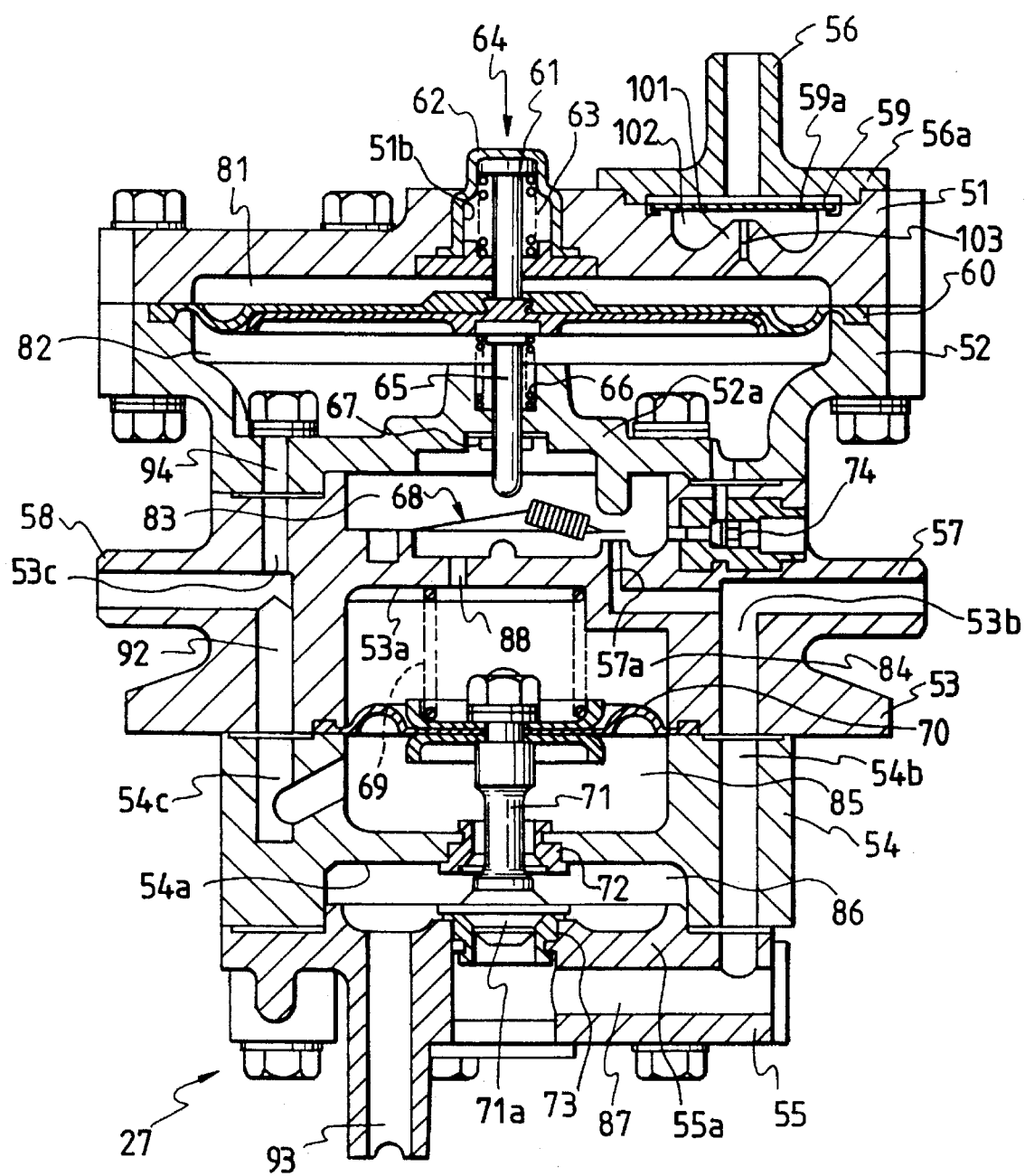
FIG. 3 is a longitudinal sectional view showing an example of the vacuum valve control device of the present invention attached to the vacuum valve.

FIG. 3 is a longitudinal sectional view of the vacuum valve control device 27. This vacuum valve control device 27 includes a casing composed of five cases, which are the first case 51 to the fifth case 55. The first case 51 to the fifth case 55 are sequentially disposed from the top to the bottom, and integrated into one body with bolts. Usually, the fourth case 54 is engaged with an upper end of the second housing 22 of the vacuum valve 15 and fastened by a band cramp 36 (shown in FIGS. 2A and 2B).

A liquid detecting pipe section 56 is mounted on an upper surface of the uppermost first case 51, and a flexible hose 38 connected with the liquid level detecting pipe 37 is attached to the liquid level detecting pipe section 56. An atmospheric pressure connecting pipe section 58 is integrated with the third case 53, and a flexible hose 44, connected with an atmospheric communicating pipe 43, is connected with the atmospheric pressure connecting pipe section 58. Consequently, the pressure inside the atmospheric pressure connecting pipe section 58 is the same as the atmospheric pressure. A vacuum connecting pipe section 57 is integrated with the third case 53, and a flexible hose 41 communicating with the vacuum discharge pipe 14 is connected with the vacuum connecting pipe section 57. Consequently, the inside of the vacuum connecting pipe section 57 is put in a vacuum condition in the same manner as the vacuum discharge pipe 14. Further, a communicating pipe section 93 is integrated with the lowermost fifth case 55 in such a manner that the communicating pipe section 93 protrudes downward from the fifth case 55, and the communicating pipe section 93 communicates with the valve operating chamber 25 in the second housing 22.

An upper pressurizing chamber 81, which is open downward, is provided on a lower surface of the uppermost first case 51. An opening portion of this upper pressurizing chamber 81 is airtightly covered with a liquid level detecting diaphragm 60 disposed between the first case 51 and the lower second case 52. A lower decompressing chamber 82, which opens upward, is formed in an upper portion of the second case 52. An opening of this lower decompressing chamber 82 is covered with the liquid level detecting diaphragm 60. Consequently, the liquid level detecting diaphragm 60 isolates the upper pressurizing chamber 81 from the lower decompressing chamber 82.

The lower decompressing chamber 82 in the second case 52 is covered with a lower surface section 52a, and a through-hole 94 is vertically formed in this lower surface section 52a. This through-hole 94 communicates with a communicating passage 53c which in turn communicates with the atmospheric pressure connecting pipe section 58 provided in the third case 53, wherein the communicating passage 53c makes a right angle with the atmospheric pressure connecting pipe section 58. Accordingly, the lower decompressing chamber 82 communicates with the atmospheric pressure connecting pipe section 58.

The third case 53 disposed under the second case 52 is provided with a pressure control chamber 83 which is open upward to the upper central portion. An upper decompressing chamber 84 isolated by the bulkhead 53a is provided under this pressure control chamber 83. This upper decompressing chamber 84 opens downward, and the opening is airtightly covered with a valve driving diaphragm 70 disposed between the third and fourth cases 53, 54. A lower decompressing chamber 85, which is open upward, is provided at the center of the upper surface of the fourth case 54. An opening of this lower decompressing chamber 85 is airtightly covered with the valve driving diaphragm 70. Consequently, the valve driving diaphragm 70 airtightly isolates the upper pressurizing chamber 84 from the lower decompressing chamber 85. A suction chamber 86, which is isolated from the lower pressurizing chamber 85 by the bulkhead 54a, is formed at a lower central portion of the fourth case 54. This suction chamber 86 opens downward, and its opening is covered with the lowermost fifth case 55. This suction chamber 86 communicates with a communicating pipe section 93, which in turn communicates with the valve operating chamber 25 of the vacuum valve 15.

Figure 4:
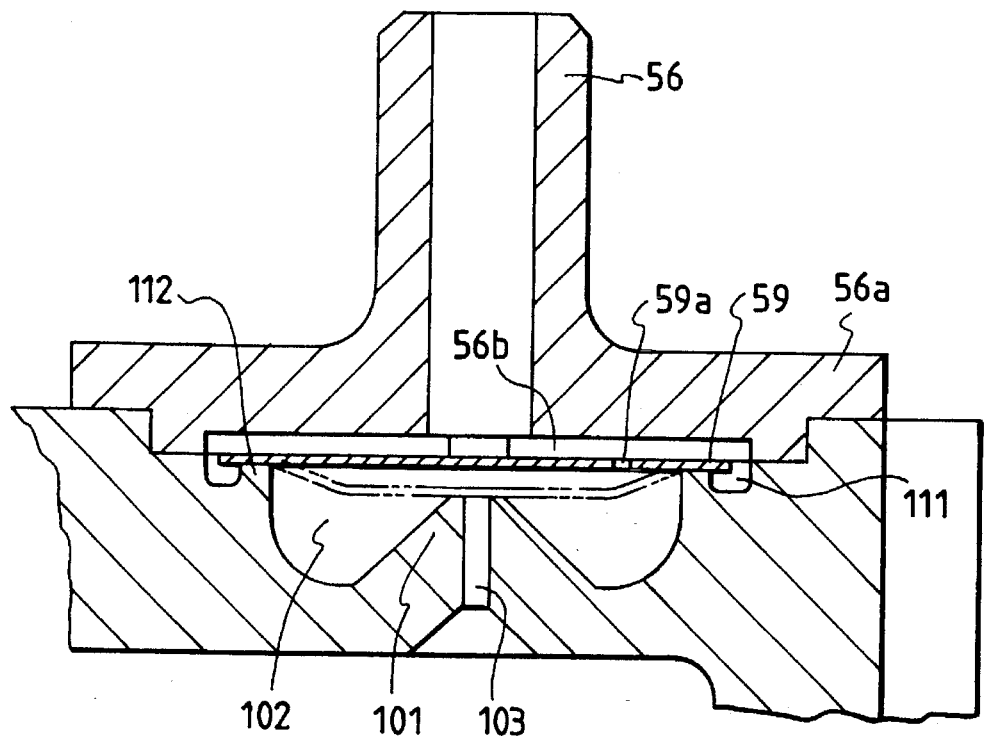
FIG. 4 is an enlarged sectional view showing the primary portion of the vacuum valve control device.
Figure 5:
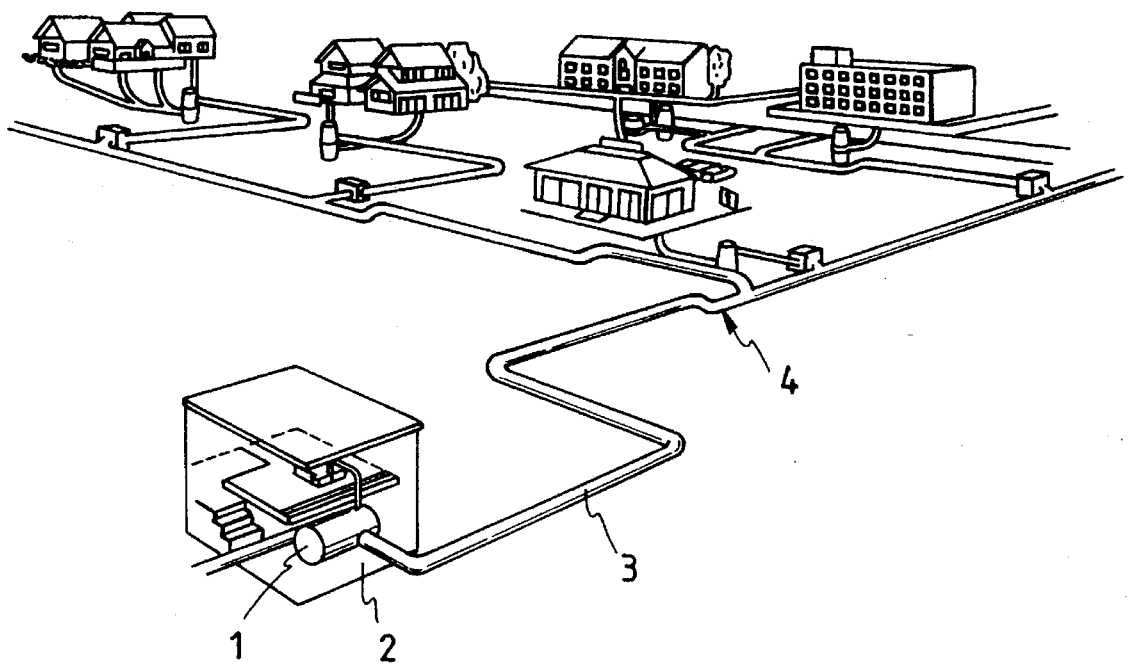
FIG. 5 is a view showing a model of a vacuum type sewage collecting system.

A pressure adjusting chamber 102 which opens upward is provided on an upper side surface of the first case 51. FIG. 4 is an enlarged sectional view of the pressure adjusting chamber 102. An annular groove 111 is formed in the periphery of the opening on the upper surface of the pressure adjusting chamber 102, wherein an appropriate gap is formed between the annular groove 111 and the inner circumferential surface of the opening. An annular support portion 112 protruding upward is provided between the groove 111 and the inner circumferential surface of the opening in such a manner that the annular support portion 112 covers all the circumference of the opening. An outer circumferential portion of the disk-shaped damping diaphragm 59 is put on and supported by the support portion 112. An outer periphery of the damping diaphragm 59 is disposed over the groove 111 while the remaining circumference is disposed over support 112 and pressure adjusting chamber 102.

The liquid level detecting pipe section 56 is disposed over the pressure adjusting chamber 102. At one end of this liquid detecting pipe section 56, a flange 56a is provided. This flange 56a is mounted on the first case 51 in such a manner that the flange 56a covers the opening on the upper surface of the pressure adjusting chamber 102. A cutout portion 56b surrounding the annular groove 111 is formed in the flange 56a so that an appropriate gap can be formed between the cutout portion 56b and the upper surface of the damping diaphragm 59. Accordingly, the damping diaphragm 59 is opposed to the inside of the cutout portion 56b, and its outer periphery is not fixed but it is simply placed on the support portion 112.

A flexible hose 38 (shown in FIGS. 2A and 2B) is connected with the liquid level detecting pipe section 56, and the liquid level detecting pipe 37 dipped in the sewage of the sewage tank communicates with the flexible hose 38.

A valve seat 101 (shown in FIG. 4) opposed to the end opening of the liquid level detecting pipe section 56 is provided in the pressure adjusting chamber 102 in such a manner that the valve seat 101 protrudes to approach the liquid level detecting pipe section 56. A communicating hole 103 for communicating the pressure adjusting chamber 102 with the upper pressurizing chamber 81, is vertically provided on the valve seat 101. The inner diameter of this communicating hole 103 is fixed.

One through-hole 59a, the diameter of which is minute, is formed on the damping diaphragm 59 so that the damping diaphragm 59 can not be deformed when the pressure in the liquid detecting pipe section 56 is gently increased. This through-hole 59a is formed at a position located outside of the end surface opening of the communicating hole 103. The diameter of this through-hole 59a is sufficiently smaller than that of the opening of the liquid level detecting pipe section 56. In addition, the diameter of the through-hole 59a is smaller than that of the communicating hole 103 of the valve seat 101. Preferably, a diameter of the through-hole 59a is determined in such a manner that area of the through-hole is less than 1/8 of the cross-section of the communicating hole 103. That is, the diameter of the through-hole 59a may be not more than 0.4 [mm], and preferably the diameter of the through-hole 59a may be about 0.3 [mm]. If the pressure in the liquid level detecting pipe section 56 is increased by a gradual increase of the level of sewage flowing into the sewage tank 11, the aforementioned damping diaphragm 59 is not resiliently deformed since the pressure is released to the pressure adjusting chamber 102 through the minute through-hole 59a.

On the other hand, if the pressure in the pressure adjusting chamber 102 is reduced, the damping diaphragm 59 comes into contact with the upper surface of the valve seat 101 as illustrated by a two-dotted chain line in FIG. 4, so that the communicating hole 103 in the valve seat 101 is airtightly closed by a portion of the damping diaphragm 59.

If the pressure in the pressure adjusting chamber 102 is increased, a gap is formed between the support portion 112 and the outer periphery of the damping diaphragm 59 placed on the support portion 112. Therefore, the pressure in the pressure adjusting chamber 102 is released through the gap.

Referring to FIG. 3, a push button 64 for manually operating the vacuum valve control device 27 is provided in the center of the upper surface of the first case 51. This push button 64 is provided with a plunger 61 which penetrates a through-hole 51b formed in the center of the upper surface of the first case 51. This plunger 61 is slidably supported in the through-hole 51b. This plunger 61 is pushed upward by a pushing spring 63, and covered with a resilient cover 62. When this push button 64 is pressed, the plunger 61 is lowered to resist the pushing force of the push spring 63, so that the center of the liquid level detecting diaphragm 60 is pushed downward and is thereby resiliently deformed.

The liquid level detecting diaphragm 60 is disposed between the upper pressurizing chamber 81 in the first case 51 and the lower decompressing chamber 82 in the second case 52. At the center of the liquid level detecting diaphragm 60, a plunger 65 is provided, which vertically penetrates the lower decompressing chamber 82. This plunger 65 penetrates the center of the lower surface 52a of the second case 52 disposed at a lower position of the lower decompressing chamber 82. The plunger 65 is disposed within the pressure control chamber 83 formed in the third case 53. A push spring 66 is engaged with the plunger 65 in a region between the lower surface 52a and the liquid level detecting diaphragm 60. The plunger 65 and the liquid level detecting diaphragm 60 are pushed upward by the push spring 66. An O-ring 67 engaged with the plunger 65, that has entered the pressure adjusting chamber 83, is attached onto a lower surface of the lower surface portion 52a. By the action of this O-ring, a boundary between the plunger 65 and the pressure control chamber 83 is sealed.

A communicating passage 57a for communicating the pressure control chamber 83 with the vacuum connecting pipe section 57 is provided in the third case 53 in which the pressure control chamber 83 is provided. A vertical communicating passage 53b, the upper end of which communicates with the vacuum connecting pipe section 57, is provided in the third case 53. Further, this communicating passage 53b communicates with the communicating passage 54b vertically penetrating the fourth case 54. This communicating passage 54b communicates with a suction passage 87 horizontally provided in the lowermost fifth case 55.

An opening portion of the communicating passage 57a, communicating with the vacuum connecting pipe section 57 in the third case 53, is formed in the pressure control chamber 83. This opening portion is opened and closed by the detecting valve 68 disposed in the pressure control chamber 83. In this embodiment, a snap-action-valve is used for the detecting valve 68. The snap-action-valve includes: a leaf spring coming into contact with the plunger 65 when the plunger 65 is lowered; and a tongue piece attached to an end of the leaf spring so that the tongue piece can close an opening of the communicating passage 57a by the pushing force of this leaf spring. When the plunger 65 is lowered and contacted with the leaf spring, the tongue piece is moved upward so that the communicating passage 57a can be opened. Due to the foregoing, the pressure control chamber 83 is communicated with the vacuum connecting pipe section 57 through the communicating passage 57a.

In the third case 53 in which the pressure control chamber 83 is provided, a communicating passage is formed, which communicates the pressure control chamber 83 with the lower decompressing chamber 82 in the second case 52 above the pressure control chamber 83, and a needle valve 74 is disposed in this passage. This needle valve 74 adjusts the amount of air flowing into the pressure control chamber 83 when the atmosphere is introduced into the lower decompressing chamber 82. Consequently, a period of time in which the atmosphere is introduced into the pressure control chamber 83 is adjusted by the needle valve 74.

The pressure control chamber 83 is isolated from the upper decompressing chamber 84 disposed below the pressure control chamber 83, by the bulkhead 53a of the third case 53. At the center of the bulkhead 53a, a communicating hole 88 is vertically formed, which communicates the pressure control chamber 83 with the upper decompressing chamber 84. In the upper decompressing chamber 84, a push spring 69 is provided, which presses downward the valve driving diaphragm 70 for separating the upper decompressing chamber 84 from the lower pressurizing chamber 85 disposed below the upper decompressing chamber 84. A rod-shaped changeover valve 71 vertically penetrating the lower pressurizing chamber 85 is attached at the center of the lower surface of the valve driving diaphragm 70.

A bulkhead 54a isolates the lower pressurizing chamber 85 from the suction chamber 86, both of which are respectively provided in the fourth case 54. The changeover valve 71 penetrates a through-hole formed in this bulkhead 54a in the fourth case 54, wherein a gap is formed between the changeover valve 71 and the through-hole formed in this bulkhead 54a. A valve body 71a is attached to a lower end of the changeover valve 71 which is disposed in the suction chamber 86. A valve seat 72 is provided in the through-hole of the bulkhead 54a through which the changeover valve 71 is penetrated, and the valve body 71a engages with the valve seat 72 so as to close the through-hole when the valve body 71a is move upward. In the bulkhead 55a disposed in a lower portion of the suction chamber 86 in the fifth case 55, a through-hole is formed, which communicates the suction chamber 86 with the suction passage 87 horizontally provided below the suction chamber 86. In this through-hole, a valve seat 73 is provided, with which the valve body 71a is engaged so as to close the through-hole when the valve body 71a is lowered.

In the fourth case 54 in which the lower pressurizing chamber 85 is provided, a communicating passage 54c, one end of which communicates with the lower pressurizing chamber 85, formed. The other end of this communicating passage 54c is communicates with the lower end of a communicating passage 92 vertically provided in the third case 53 disposed above the fourth case 54. The upper end of this communicating passage 92 communicates with the atmospheric pressure connecting pipe section 58. Accordingly, when the atmosphere is introduced to the atmospheric pressure connecting pipe section 58, the atmosphere is introduced into the lower pressurizing chamber 85 through the communicating passages 92 and 54*c*.

The vacuum valve 15 having the construction described above operates as follows. The vacuum connecting pipe section 57 in the vacuum valve control device 27 communicates with the vacuum discharge pipe 14. Therefore, the inside of the vacuum connecting pipe section 57 is maintained in a vacuum condition. When an amount of sewage in the sewage tank 11 is gradually increased and the pressure in the liquid level detecting pipe 37, the lower end of which is dipped in the sewage, is gradually increased under the aforementioned condition, the pressure in the liquid level detecting pipe section 56 of the vacuum valve control device 27 communicating with the liquid level detecting pipe 37 through the flexible hose 38, is gradually increased. Due to the foregoing, the pressure in the pressure adjusting chamber 102 is gradually increased through the minute through-hole 59*a* formed on the damping diaphragm 59 covering the opening of the liquid level detecting pipe section 56. At this time, the damping diaphragm 59 is not resiliently deformed, so that the communicating hole 103 of the valve seat 101 is not closed. Accordingly, when the pressure in the pressure adjusting chamber 102 is gradually increased, the pressure in the upper pressurizing chamber 81, which communicates with the pressure adjusting chamber 102 through the communicating hole 103 of the valve seat 101, is gradually increased.

When the pressure in the upper pressurizing chamber 81 is gradually increased, the liquid level detecting diaphragm 60 is gradually deformed downward in the manner of resilience. The lower decompressing chamber 82 disposed below the liquid level detecting diaphragm 60 communicates with the atmospheric pressure connecting pipe section 58 through the through-hole 94 and the communicating passage 53*c*. Further this atmospheric pressure connecting pipe section 58 is communicated with the atmosphere communicating pipe 43 through the flexible hose 44. Therefore, when the liquid level detecting diaphragm 60 is gradually deformed downward in the manner of resilience, air in the lower decompressing chamber 82 is discharged. Due to the foregoing, the plunger 65 attached to the liquid level detecting diaphragm 60 is moved downward.

When the plunger 65 is moved downward, the detecting valve 68 provided in the pressure control chamber 83 is pushed by the plunger 65, so that an opening of the communicating passage 57*a* located in the pressure control chamber 83 is opened. Due to the foregoing, the pressure control chamber 83 is put in a vacuum condition through the communicating passage 57*a* which has been put in a vacuum condition. When the pressure control chamber 83 is put in a vacuum condition, the upper decompressing chamber 84 disposed below the bulkhead 53*a* is also put in a vacuum condition through the communicating hole 88 formed in the bulkhead 53*a*. The lower pressurizing chamber 85 disposed below the upper decompressing chamber 84 through the valve driving diaphragm 70 communicates with the atmospheric pressure connecting pipe section 58 through the communicating passages 54*c* and 92, so that the lower pressurizing chamber 85 is open to the atmosphere. Accordingly, the valve driving diaphragm 70 is resiliently deformed upward resisting the push spring 69 when the pressure in the upper decompressing chamber 84 is reduced.

When the valve driving diaphragm 70 is resiliently deformed upward, the changeover valve 71 attached to this valve driving diaphragm 70 is moved upward, so that the valve body 71*a* attached to a lower end of the changeover valve 71 opens the valve seat 73 provided in a lower portion of the suction chamber 86, and at the same time the valve body 71*a* closes the valve seat 72 provided in an upper portion of the suction chamber 86. Under the condition described above, the suction chamber 86 communicates with the suction passage 87 through the lower valve seat 73, and the suction chamber 86 is put in a vacuum condition being affected by the vacuum condition in the suction passage 87 communicated with the vacuum connecting pipe section 57 through the communicating passages 54*b* and 53*b*. The communicating pipe section 93 communicated with this suction chamber 86 is also put in a vacuum condition. Due to the foregoing, the valve operating chamber 25 of the vacuum valve 15 communicated with the communicating pipe section 93 is put in a vacuum condition.

When the valve operating chamber 25 in the vacuum valve 15 is put in a vacuum condition, the plunger 30 is pulled up to resist the pushing force of the push spring 26. Therefore, the valve body 24 connected with this plunger 30 through the valve rod 29 is moved upward. As a result, the communicating section 28 is put in an open condition, and the vacuum discharge pipe 14 and the suction pipe 13 communicate with each other through the communicating section 28, and sewage in the sewage tank 11 is sucked into the suction pipe 13 by the action of vacuum in the vacuum discharge pipe 14. Sewage in the sewage tank 11 is sucked into the suction pipe 13 in a brief period, and further sucked into the vacuum discharge pipe 14 through the communicating section 28. After that, sewage is collected to the sewage collection tank through the vacuum pipe which has been put in a vacuum condition.

When sewage in the sewage tank 11 is discharged in a moment, pressure in the liquid level detecting pipe 37 is quickly lowered, and pressure in the liquid level detecting pipe section 56 is also quickly lowered. Due to the foregoing, the damping diaphragm 59 in the pressure adjusting chamber 102 is sucked toward the liquid level detecting pipe section 56. Since the outer periphery of the damping diaphragm 59 is not fixed to the support portion 112 disposed around the pressure adjusting chamber 102 but the outer periphery of the damping diaphragm 59 is placed and supported by the support portion 112, a gap is formed between this support portion 112 and the damping diaphragm 59, and pressure in the pressure adjusting chamber 102 is quickly released to the liquid level detecting pipe section 56.

Since the pressure adjusting chamber 102 communicates with the upper pressurizing chamber 81 through the communicating hole 103, air in the upper pressurizing chamber 81 is also quickly discharged into the liquid level detecting pipe section 56 through the pressure adjusting chamber 102. Due to the forging, the liquid level detecting diaphragm 60 that has been resiliently deformed downward is returned to its initial condition.

Since the lower decompressing chamber 82 disposed below the liquid level detecting diaphragm 60 is open to the atmosphere through the long atmosphere communicating pipe 43, the atmosphere does not flow into the lower decompressing chamber 82 through the atmosphere communicating pipe 43. However, air in the upper pressurizing chamber 81 disposed above the liquid level detecting diaphragm 59 quickly flows out to the liquid level detecting pipe section 56 through the damping diaphragm 60 when the pressure in the liquid level detecting pipe section 56 is quickly reduced. Therefore, the liquid level detecting diaphragm 60 that has been resiliently deformed is quickly and smoothly returned to its initial condition.

After the resilient deformation of the liquid level detecting diaphragm 60 has been quickly canceled by the action of air flowing out from the periphery of the damping diaphragm 59, the plunger 65 attached to the lower surface of the liquid level detecting diaphragm 60 is moved upward. Then the detecting valve 68 pushed by the plunger 65 returns to its initial condition, and the detecting valve 68 closes the communicating passage 57a communicating with the vacuum connecting pipe section 57. Due to the foregoing, the communicating condition between the pressure control chamber 83 and the vacuum connecting pipe section 57 in a vacuum condition is shut off.

At this time, the pressure control chamber 83 is in a vacuum condition. However, this vacuum condition can be canceled after a small time lag when the atmosphere flowing into the lower decompressing chamber 82 from the atmosphere connecting pipe section 58 through the communicating passage 53c and through-hole 94, gradually flows into the pressure control chamber 83 through the needle valve 74.

When the vacuum condition of the pressure control chamber 83 is canceled, the vacuum condition of the upper decompressing chamber 84 communicating with the pressure control chamber 83 through the communicating hole 88 is also canceled, and the valve driving diaphragm 70 is pushed downward by the push spring 69, so that the upward resilient deformation of the valve driving diaphragm 70 is canceled. Due to the foregoing, the changeover valve 71 attached to the valve driving diaphragm 70 is moved downward, and the valve body 71a attached to the lower end opens the valve seat 72 on the upper side, and at the same time, closes the valve seat 73 on the lower side. As a result, the communicating pipe section 93 which already communicates with the valve operating chamber 25 of the vacuum valve 15 communicates with the atmosphere connecting pipe section 58 through the suction chamber 86, the lower pressurizing chamber 85 disposed above the suction chamber, and the communicating passages 54a and 92. Therefore, the atmosphere in the atmosphere connecting pipe section 58 is introduced into the communicating pipe section 93. Due to the foregoing, the vacuum condition in the valve operating chamber 25 of the vacuum valve 15 is canceled, and the plunger 30 of the vacuum valve 15 is moved downward by the pushing force of the push spring 26, so that the valve body 24 closes the communicating section 28.

The vacuum condition of the communicating pipe section 93 communicating with the valve operating chamber 25 is canceled by the atmosphere introduced into the lower pressurizing chamber 85 from the atmosphere connecting pipe section 58 through the communicating passage 92. The atmosphere connecting pipe section 58 is also connected with the lower decompressing section 82 through the communicating passage 53c extending upward and the through-hole 94. A volume of the valve operating chamber 25 of the vacuum valve 15 is large, so that a large amount of atmosphere flows into the valve operating chamber 25 through the communicating pipe section 93. Accordingly, there is a possibility that the pressure of the lower decompressing chamber 82 reduced, which is communicates with the atmosphere connecting pipe section 58 through the communicating passage 53c and the through-hole 94. In the case where the pressure in the lower decompressing chamber 82 is reduced, the liquid level detecting diaphragm 60 is sucked downward and deformed a little, so that the pressure in the upper pressurizing chamber 81 is also reduced. Due to the foregoing, the pressure adjusting chamber 102 communicating through the communicating hole 103 is decompressed. Though a minute through-hole 59a is formed on the damping diaphragm 59 covering the pressure adjusting chamber 102, the diameter of the minute through-hole 59a is sufficiently smaller than that of the communicating hole 103 formed in the valve seat 101. Accordingly, the damping diaphragm 59 is resiliently deformed downward by the action of decompression in the pressure adjusting chamber 102. Due to the foregoing, a portion of the damping diaphragm 59 where the through-hole 59a is not formed, comes into close contact with an upper surface of the valve seat 101, so that an opening on the upper surface of the communicating hole 103 is closed. As a result, air in the pressure adjusting chamber 102 does not flow into the upper pressurizing chamber 81 through the communicating hole 103. Therefore, the liquid level detecting diaphragm 60 can be prevented from being resiliently deformed downward. Due to the foregoing, the plunger 65 can be prevented from moving downward and coming into contact with the detecting valve 68. Therefore, the valve body 24 of the vacuum valve 15 can be prevented from re-opening the communicating section 28.

Second Embodiment

In the vacuum valve control-device of the first embodiment, the needle valve adjusts the amount of air by adjusting the gap between the outer cylinder and the needle. The gap of the needle valve that can provide an optimal opening time of the vacuum valve is extremely small. Therefore, if the vacuum valve is repeatedly operated for a long period of time, dust, moisture and the like are introduced from outside, gradually narrowing the small gap. As a result, the gap is varied so as to increase the opening time, leaving the vacuum valve open in the worst case.

According to the second embodiment, a cylindrical elastic body is used as the opening time adjusting valve instead of a conventional gap adjusting needle valve, so that the sectional area of the air hole that can provide a relatively large air passage can be made variable by compression. The other elements are similar to those of the first embodiment. Therefore, even with a repeated operation of the vacuum valve over a long period of time, dust, moisture and the like can pass through the valve, so that the initially set opening time of the vacuum valve can be maintained stably over a long period of time.

Figure 9:
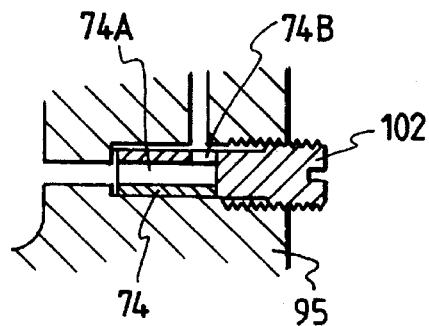
FIG. 9 is a view showing a model of the exemplary opening time adjusting valve of the invention.

An air release valve 74, which is an opening time adjusting valve, is provided on the upper chamber 83 of the third case 53. The air release valve 74 is designed so that the atmosphere is gradually introduced via an air hole 74A thereof (FIG. 9). The air release valve 74 is formed of a thick, cylindrical elastic body such as rubber or thermoplastic elastomer. The inner diameter portion of the air release valve 74 constitutes the air hole 74A. An opening portion 74B of the air hole 74A is formed on an end of the thick-walled portion. The sectional area of the air hole 74A can be varied by adjusting the degree of compression axially applied to the air hole 74A by an opening time adjusting screw 102. The air release valve 74 is used in the following way. When the vacuum of the vacuum discharge pipe 14 is high, the opening time adjusting screw 102 is loosened to increase the sectional area of the air hole 74A of the air release valve 74 so that the opening time of the vacuum valve can be decreased, and when the vacuum of the vacuum discharge pipe 14 is low, the opening time adjusting screw 102 is tightened to decrease the sectional area of the air hole 74A of the air release valve 74 so that the opening time of the vacuum valve can be increased.

Third Embodiment

A third embodiment of the present invention will be explained as follows.

According to the third embodiment, an opening time adjusting valve which is automatically controlled is provided. The other elements are similar to those of the first embodiment.

Example 1

Figure 6A:
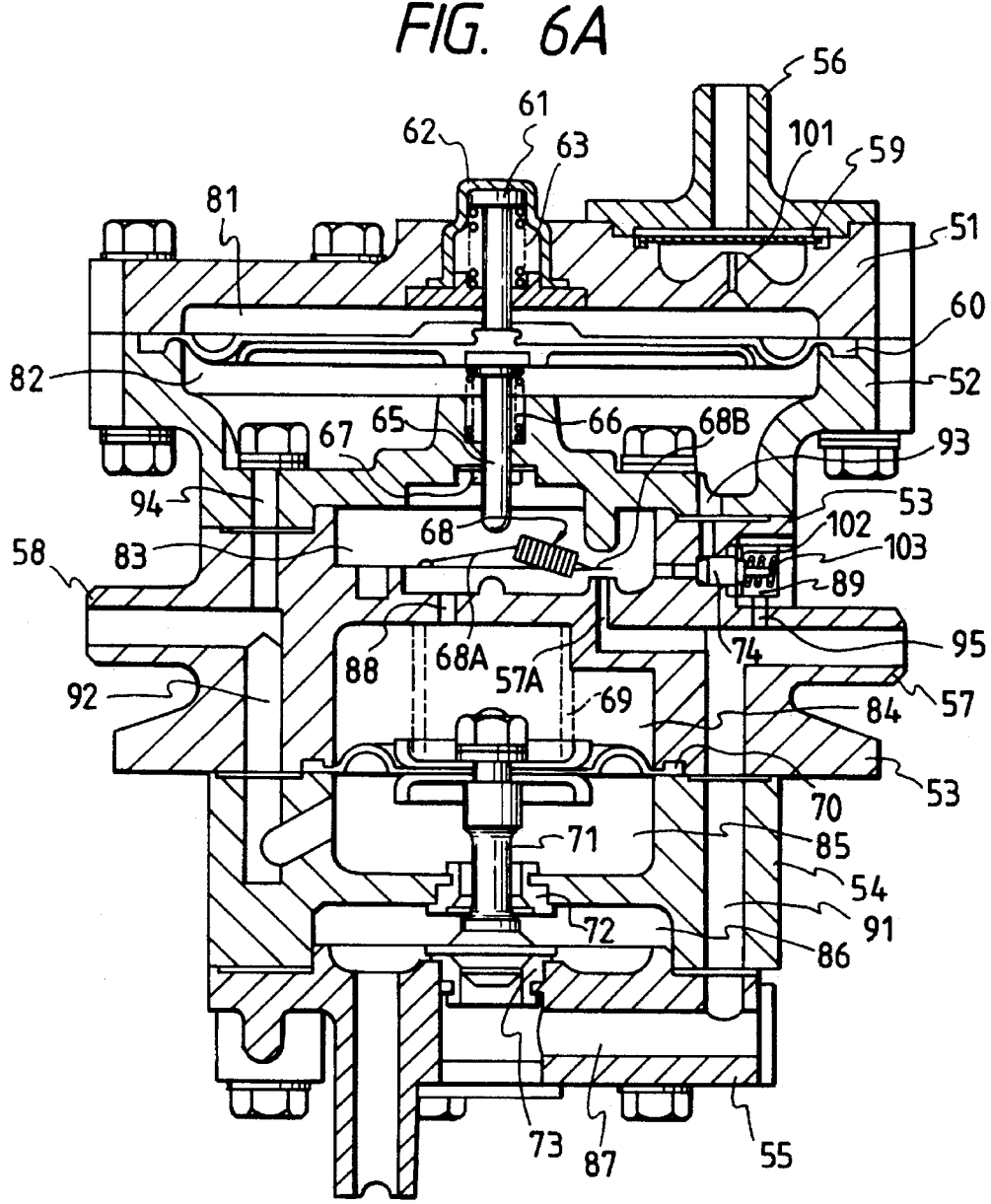
FIG. 6A is a sectional view showing the controller section.
Figure 6B:
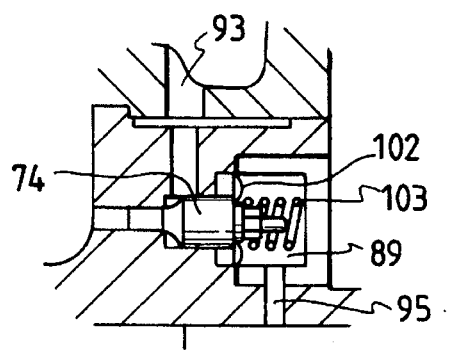
FIG. 6B is an enlarged sectional view showing the valve portion of FIG. 6A.

As shown in FIGS. 6A and 6B, a diaphragm 102 is attached to the needle valve 74, which is balanced between the pushing force of the spring 103 and the vacuum in the vacuum discharge pipe 14 communicating with a passage 95, so that the needle valve 74 is displaced to an appropriate position. When the degree of vacuum in the vacuum discharge pipe 14 is high, the valve lift of the needle valve 74 is increased, and when the degree of vacuum is low, the lift of the needle valve 74 is decreased.

According to this first example, the following mode of operation can be provided. When the valve lift of the needle valve 74, which is used as an opening time adjusting valve, is automatically controlled in accordance with the vacuum transmitted from the vacuum discharge pipe 14, (a) the higher the vacuum is, the larger the valve lift of the needle valve 74 is increased, so that the vacuum valve 15 is closed in a short period of time, and (b) the lower the vacuum is, the smaller the valve lift of the needle valve 74 is decreased, so that the vacuum valve is opened over a long period of time. Due to the foregoing, an air/liquid ratio in the pipe line can be maintained in a predetermined range, and the vacuum type liquid collecting/transporting apparatus can be stably operated.

Example 2

Figure 7A:
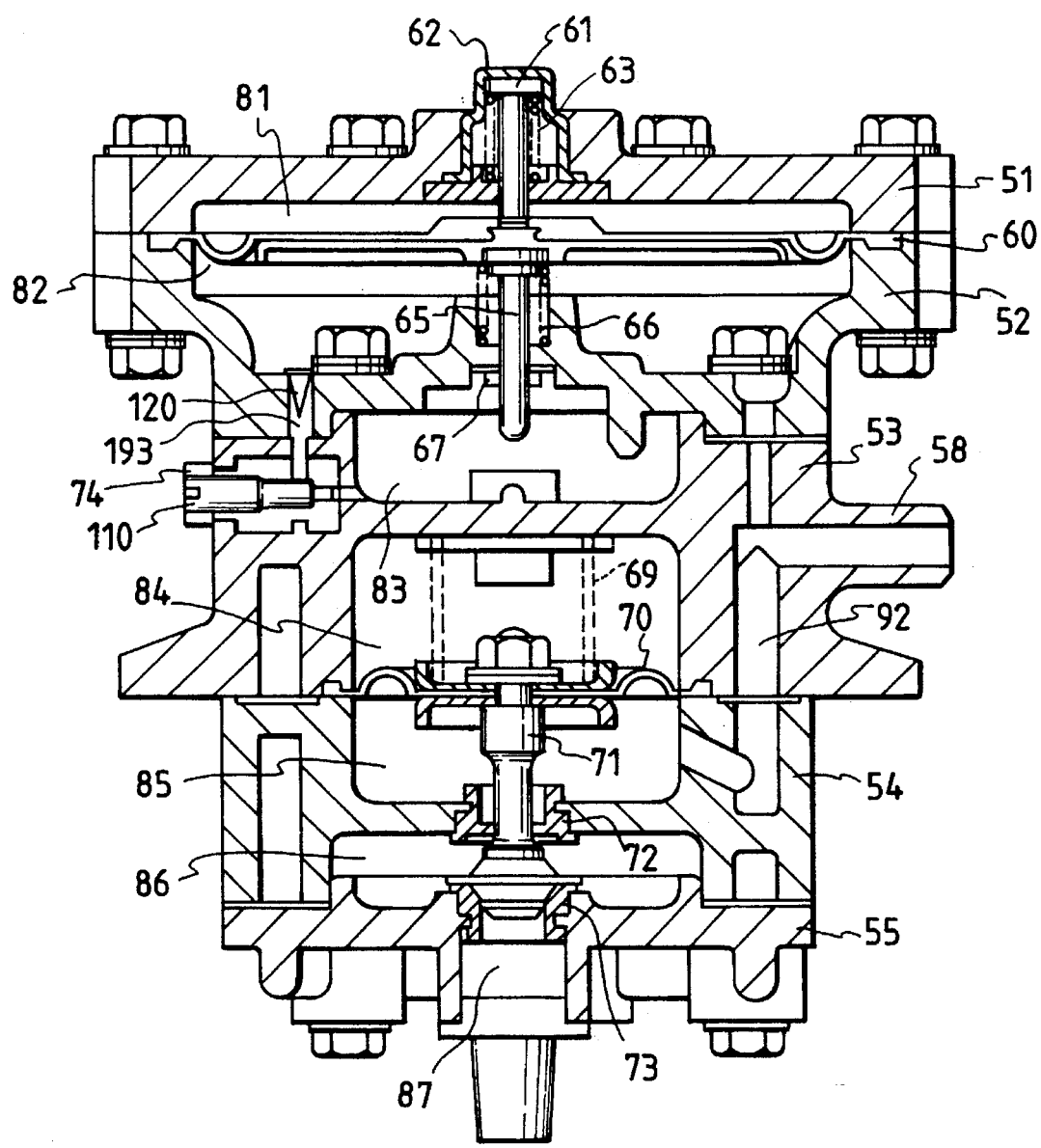
FIG. 7A is another sectional showing the controller section of the third embodiment.
Figure 7B:
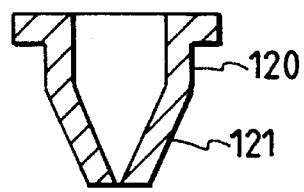
FIGS. 7B and 7C are views showing a model of the duckbill valve.
Figure 7C:
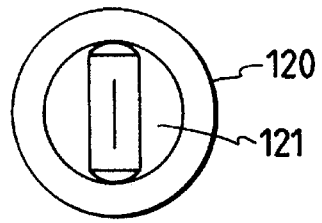

The second example is distinguished from the first example in that a needle valve 110 and a duckbill valve 120 are used as opening time adjusting valves provided in the controller section 27 as shown in FIGS. 7A–7C. The other elements are similar to those of the first example.

The needle valve 110 and the duckbill valve 120 are provided in the passage 193 communicating the inside and outside of the upper chamber 83 (pressure control chamber) of a third case 53. In this embodiment, the duckbill valve 120 is provided in the passage 193 farther than the needle valve 110. The duckbill valve 120 may, however, be provided in the passage 193 closer to the upper chamber 83 than the needle valve 110.

The needle valve 110 is adjusted so as to spirally move back and forth with respect to the valve seat provided within the passage 193. The needle valve 110 is used by appropriately adjusting the gap with respect to the valve seat.

The duckbill valve 120 can adjust the valve lift with a vacuum force in the upper chamber 83 being applied to the outer surface of a bill 121 thereof. When the vacuum force is high, the valve lift of the duckbill valve 120 is increased due to a large pressure difference between the atmospheric pressure exerted upon the inner surface of the bill 121 and the high negative pressure exerted upon the outer surface of the bill 121, and when the vacuum force is low, the valve lift of the duckbill valve 120 is decreased due to a small pressure difference between the atmospheric pressure exerted upon the inner surface of the bill 121 and the low negative pressure exerted upon the outer surface of the bill 121.

According to the second example, when the valve lift of the duckbill valve 120, which is used as an opening time adjusting valve, is automatically controlled in accordance with the vacuum force in the chamber 83. In other words for the vacuum transmitted from the vacuum discharge pipe 14, (a) the higher the vacuum is, the larger the valve lift of the duckbill valve 120 is increased, so that the vacuum valve 15 is closed in a short period of time, and (b) the lower the vacuum is, the smaller the valve lift of the duckbill valve 120 is decreased, so that the vacuum valve is opened for a long period of time. Due to the foregoing, an air/liquid ratio in the pipe line can be maintained in a predetermined range, and the vacuum type liquid collecting apparatus can be stably operated.

Example 3

Figure 8A:
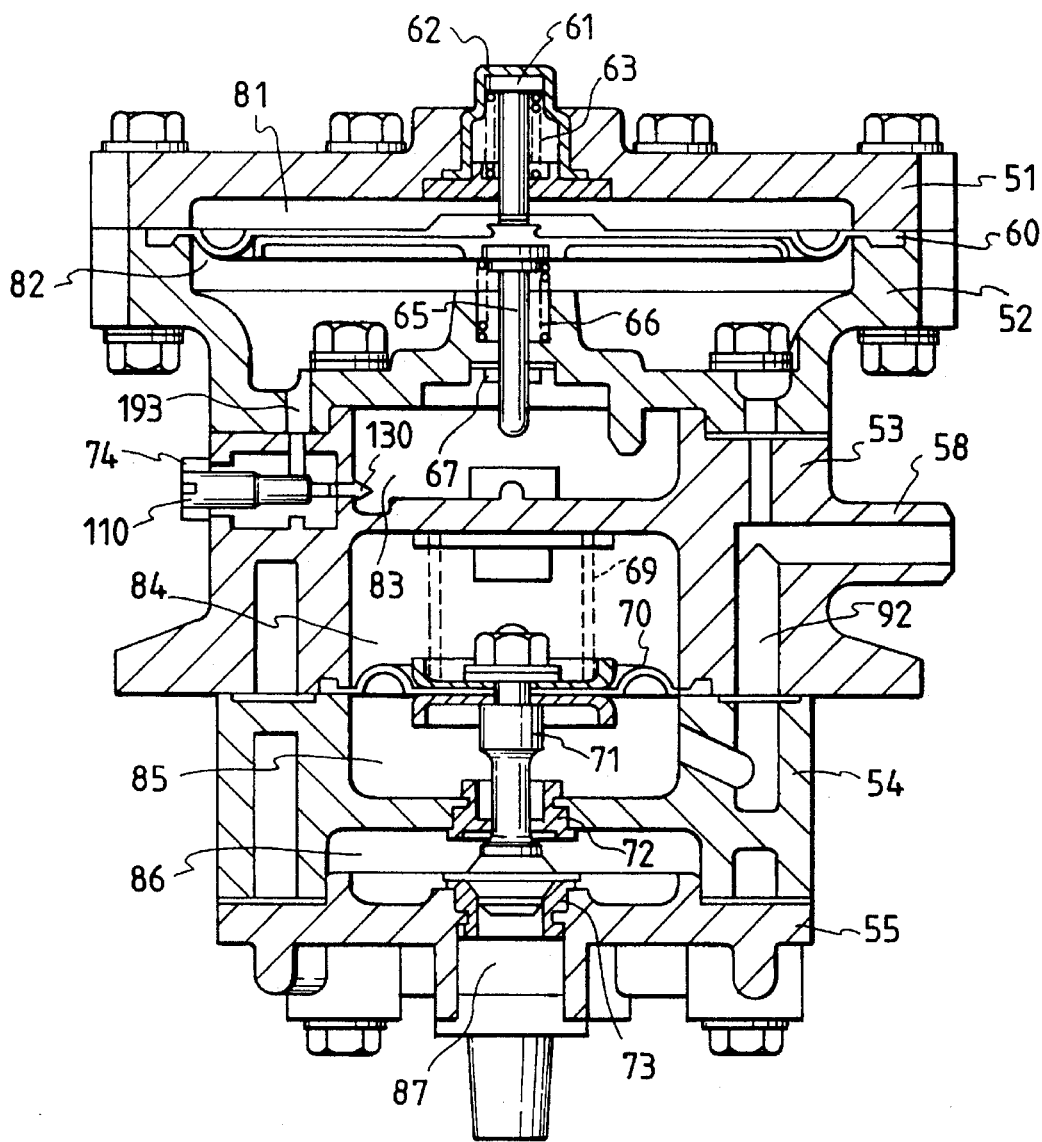
FIG. 8A is another sectional view showing the controller section of the third embodiment.
Figure 8B:
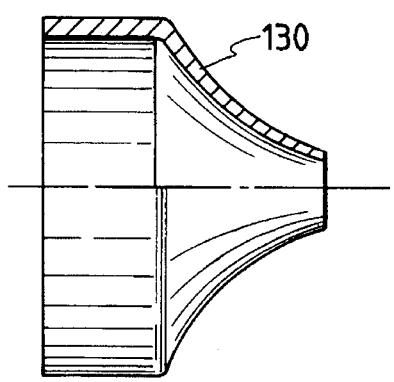
FIGS. 8B and 8C are views showing a model of the flexible conical orifice valve.
Figure 8C:
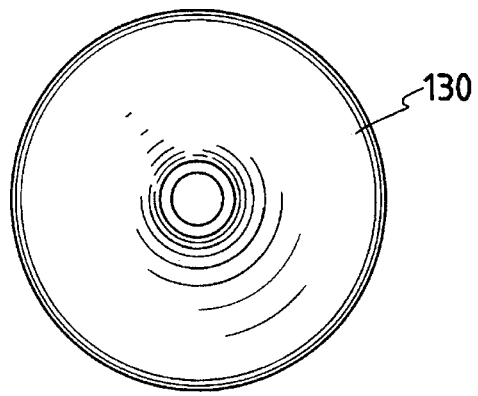

The third example is distinguished from the first example in that both a needle valve 110 and a flexible conical orifice valve 130 are used as opening time adjusting valves provided in the controller section 27 as shown in FIGS. 8A–8C. The other elements are similar to those of the first example.

The needle valve 110 and the orifice valve 130 are provided in the passage 193 communicated with the inside and outside of the upper chamber 83 (pressure control chamber) of the third case 53. In this embodiment, the orifice valve 130 is provided at an opening of the passage 193 to the chamber 83. The orifice valve 130 may, however, be provided in the passage 193 farther from the chamber 83 than the needle valve 110.

Similarly to the second embodiment, the needle valve 110 is adjusted so as to spirally move back and forth with respect to the valve seat provided in the passage 193. The needle valve 110 is used by appropriately adjusting the gap with respect to the valve seat.

The orifice valve 130 is formed of a flexible elastic body such as rubber and elastomer, and is designed so that the valve lift can be adjusted with a vacuum force in the chamber 83 applied to the outer surface of the cone. When the vacuum force is high, the valve lift of the orifice valve 130 is resiliently increased due to a large pressure difference between the atmospheric pressure exerted upon the inner surface of the cone and the high negative pressure exerted upon the outer surface of the cone, and when the vacuum force is low, the valve lift of the orifice valve 130 is resiliently decreased due to a small pressure difference between the atmospheric pressure exerted upon the inner surface of the cone and the low negative pressure exerted upon the outer surface of the cone.

According to third example, when the valve lift of the orifice valve 130, which is used as an opening time adjusting valve, is automatically controlled in accordance with the vacuum force in the chamber 83, (the vacuum transmitted from the vacuum discharge pipe 14), (a) the higher the vacuum is, the larger the valve lift of the orifice valve 130 is increased, so that the vacuum valve 15 is closed in a short period of time, and (b) the lower the vacuum is, the smaller the valve lift of the orifice valve 130 is decreased, so that the vacuum valve is opened over a long period of time. Due to the foregoing, an air/liquid ratio in the pipe line can be maintained in a predetermined range, and the vacuum type liquid collecting apparatus can be stably operated.

Fourth Embodiment

In the vacuum valve control device of the invention, a resilient rolling diaphragm 31 is provided between the first and second housings 21, 22. The valve operating chamber in the housing is airtightly isolated by the rolling diaphragm. This rolling diaphragm is made of resilient rubber, and bent between the outer circumferential surface of the plunger and the inner circumferential surface of the housing so that the rolling diaphragm can be brought into close contact with the outer circumferential surface of the plunger and the inner circumferential surface of the housing. In the case where the plunger is slid by the action of vacuum in the valve operating chamber in the housing, the rolling diaphragm is deformed so that the bent portion is moved in a sliding direction of the plunger. As described above, while a volume in the valve operating chamber is not changed, the plunger can be positively slid by the action of the rolling diaphragm when vacuum is activated.

Usually, a portion close to the bent portion of the rolling diaphragm is not closely contacted with the inner circumferential surface of the housing, but the portion is contacted with the rolling diaphragm which is closely contacted with the outer circumferential surface of the plunger. When one portion of the rolling diaphragm is contacted with another portion with pressure as described above, there is a possibility that the contacting portion is rubbed and worn away in the case where the contacting portion is moved in accordance with the sliding movement of the plunger. When the rolling diaphragm is worn away, there is a possibility that airtightness of the rolling diaphragm is deteriorated. When airtightness of the rolling diaphragm is deteriorated, airtightness of the valve operating chamber can not be maintained, and the plunger can not be driven even when the valve operating chamber is put in a vacuum condition.

Therefore, in order to suppress the abrasion of the rolling diaphragm, a method is put into practical use, in which a surface of the rolling diaphragm is coated with lubricant such as silicon grease or silicon oil. However, the coated lubricant permeates into the rolling diaphragm made of resilient material, so that the effect of the lubricant can not be exerted over a long period of time. For this reason, the rolling diaphragm must be replaced in a short period of time.

The plunger disposed in the housing is connected with a valve rod. This valve rod is inserted into a through-hole formed in the housing. A valve body is attached to an end of the valve rod located outside of the housing. A shaft seal comes into pressure contact with the valve rod so that the valve rod can slide in an airtight condition with respect to the through-hole. This shaft seal is also made of resilient substance such as rubber. Therefore, when the shaft seal slides along the valve rod, it is worn away, and airtightness is deteriorated with the lapse of time.

For this reason, a surface of the shaft seal is coated with lubricant in the same manner as that of the rolling diaphragm. However, the coated lubricant permeates into the shaft seal made of resilient material. Accordingly, there is a possibility that the shaft seal does not function in a short period of time. Since the shaft seal comes into contact with sewage flowing in the communicating section, lubricant coated on the surface of the shaft seal is removed by sewage. Consequently, there is a possibility that the effect of lubricant on the shaft seal is exerted only in a shorter period of time than that of the rolling diaphragm.

According to the fourth embodiment of the invention, the rolling diaphragm 31 airtightly isolates the valve operating chamber 25 in the first housing 21 and the second housings 22. When the valve operating chamber 25 located above the rolling diaphragm 31 is put in a vacuum condition, the plunger 30 is moved upward by the action of vacuum. At this time, in accordance with the movement of the plunger 30, the rolling diaphragm 31 is successively peeled off from the outer circumferential surface of the plunger 30 with which the rolling diaphragm 31 has come into contact, and at the same time the rolling diaphragm 31 successively comes into contact with the inner circumferential surface of the second housing 22.

This rolling diaphragm 31 is made of rubber into which lubricant such as silicon oil, silicon grease and DOP (dioctylphthalate) is kneaded in the process of forming. Therefore, the lubricant kneaded into rubber gradually oozes out from the surface. Accordingly, from the surface of the rolling diaphragm 31, lubricant oozes out at all times.

Furthermore, a shaft seal 32 air tightly coming into pressure contact with the outer circumferential surface of the valve rod 29 is provided around the through-hole of the bulkhead 21a through which the valve rod 29 is penetrated. In the same manner as that of the shaft seal 32 described before, this shaft seal 32 is made of rubber into which lubricant such as silicon oil, silicon grease and DOP (dioctylphthalate) is kneaded in the process of forming. Therefore, the lubricant kneaded into rubber gradually oozes out from the surface. Accordingly, from the surface of the shaft seal 32, lubricant oozes out at all times. The other elements are similar to those of the first embodiment.

Due to the foregoing, the valve operating chamber 25 above the rolling diaphragm 31 of the vacuum valve 15 is put in a vacuum condition. When the atmosphere is introduced into a lower portion of the rolling diaphragm 31 at this time, the plunger 30 is slid upward resisting a force of the push spring 26. In accordance with this upward sliding motion of the plunger 30, as illustrated in FIG. 2B, the bent portion of the rolling diaphragm 31 is successively moved upward, and a portion in which the rolling diaphragm 31 closely coming into contact with the outer circumferential surface of the plunger 30 is successively peeled off from the upper portion, and at the same time the rolling diaphragm 31 closely comes into contact with the inner circumferential surface of the second housing 22 upward. As described above, the valve operating chamber 25 above the rolling diaphragm 30 maintains its airtight condition while its volume is not changed, and is quickly put in a vacuum condition.

At this time, in accordance with the movement of the plunger 30, the bent portion of the rolling diaphragm 31 is changed. Since lubricant oozes out from the surface of the rolling diaphragm 31 at all times, even if the opposed bent portions come into pressure contact with each other, the abrasion of the bent portion can be suppressed. At the same time, the abrasion of the rolling diaphragm 31 which comes into contact with the outer circumferential surface of the plunger 30 and the inner circumferential surface of the second housing 22 can be prevented by the lubricant. Therefore, the rolling diaphragm 31 can be stably used over a long period of time.

When the plunger 30 is moved upward, the valve rod 29 connected with the plunger 30 is slid in an airtight condition in which the valve rod 29 comes into pressure contact with the shaft seal 32. Therefore, the valve body 24 connected with a lower end of the valve rod 29 is moved upward. As a result, the communicating section 28 is put in an open condition. Since the vacuum discharge pipe 14 is in a vacuum condition, the suction pipe 13 is also decompressed through the communicating section 28, so that sewage is sucked into the suction pipe 13. Sewage sucked into the suction pipe 13 is transported from the communicating section 28 to the vacuum discharge section 14, and collected into the collection tank.

Lubricant oozes out at all times from the surface of the shaft seal 32 which comes into pressure contact with the valve rod 29 in an airtight condition. Therefore, abrasion of the shaft seal 32 can be suppressed when the valve rod 29 slides on the shaft seal 32.

When sewage is discharged into the sewage tank 11 as described above, pressure in the liquid level detecting pipe 37 is reduced. Due to the foregoing, pressure in the vacuum valve control device 27 is lowered, and the atmosphere is introduced into the vacuum valve control device 27 through the atmosphere communicating pipe 43 and hose 44. The atmosphere introduced into the vacuum valve control device 27 is introduced into the valve operating chamber 25 through the communicating port 93, so that the vacuum condition in the valve operating chamber 25 is canceled. Due to the foregoing, the plunger 30 of the vacuum valve 15 is moved downward by a force of the push spring 26, and the valve rod 29 slides while the shaft seal 32 comes into pressure contact with the valve rod 29 under an air tight condition. In this way, the valve body 24 closes the communicating section 28.

At this time, a portion of the rolling diaphragm 31 which closely comes into contact with the inner circumferential surface of the second housing 22, is successively peeled off from the upper portion, so that the bent portion is moved downward, and the rolling diaphragm 31 successively comes into contact with the outer circumferential surface of the plunger 30 from the lower side to the upper side.

Since lubricant oozes out from the surfaces of the shaft seal 32 and the rolling diaphragm 31 in this case, abrasion on the surfaces can be prevented.

Fifth Embodiment

Furthermore, as illustrated in FIGS. 2A, 2B, 10A and 10B, the vacuum valve 15 includes a rolling diaphragm 31 made of rubber-like resilient substance such as natural rubber and elastomer which is provided between the valve operating chamber 25 and the plunger 30. As illustrated in FIG. 10A, the rolling diaphragm 31 is formed into a cylindrical shape having a bottom, and its opening flange portion 31A is interposed between the connecting portions of both housings 21, 22, and its bottom portion 31B is fixed to the plunger 30. One end portion of the rolling diaphragm 31 is capable of coming into pressure contact with the inner surface of the housing 22 composing the valve operating chamber 25, and the other end portion is capable of coming into pressure contact with the outer surface of the plunger 30.

Due to the construction described above, when the plunger 30 is vertically moved under the balance of the spring force of the spring 26 and the vacuum applied to the valve operating chamber 25 so that the valve body 24 is opened and closed, one end portion of the rolling diaphragm 31 comes into pressure contact with the inner surface of the housing 22 composing the valve operating chamber 25, and under the condition that an intermediate portion of the rolling diaphragm 31 is folded back, the other end portion comes into pressure contact with the outer surface of the plunger 30. Under the aforementioned condition, the rolling diaphragm 31 is vertically moved together with the plunger 30. At this time, the rolling diaphragm 31 is moved as if the intermediate folded portion between one end and the other end were rolled.

However, in this embodiment, under a free condition of the rolling diaphragm 31 before it is assembled, one end portion capable of coming into pressure contact with the inner surface of the housing 22 composing the valve operating chamber 25 is made to be a large diameter portion 32A, and the other end portion capable of coming into pressure contact with the outer surface of the plunger 30 is made to be a small diameter portion 32B, and the intermediate portion between 32A and 32B is made to be a tapered portion 32C. Due to the foregoing, as described later in detail, the bent inside surfaces of the intermediate folded portion are prevented from coming into contact with each other, so that the abrasion caused when the surfaces are rubbed can be prevented.

According to the above mentioned fifth embodiment, in a free condition before the assembly of the rolling diaphragm 31, one end portion is made to be a large diameter portion 32A, and the other end portion is made to be a small diameter portion, and the intermediate portion is made to be a tapered portion 32C. Accordingly, the bent inside surfaces of the intermediate folded portion are prevented from coming into contact with each other when the vacuum valve is used, so that the abrasion caused when the surfaces are rubbed can be prevented.

Furthermore, even when the valve 15 is repeatedly opened and closed, abrasion of the rolling diaphragm 31 is not caused, so that the opening and closing stability of the valve 15 can be maintained over a long period of time. Moreover, a replacing period of the rolling diaphragm 31 can be extended, and the labor required for maintenance can be greatly reduced.

In the vacuum valve 15 described above, in the case where the housing 22 is assembled under the condition that the rolling diaphragm 31 is attached to the plunger 30, it is necessary to coat a lubricant on the rolling diaphragm 31 for making the assembly work easy, because the sliding resistance of the rubber-like resilient body composing the rolling diaphragm 31 is high. Instead of coating the rolling diaphragm 31 with lubricant, a lubricant such as silicon oil may be previously kneaded into the rolling diaphragm in the process of forming, and the rubber-like resilient body from which the lubricant bleeds out may be used for the rolling diaphragm 31.

As described in the above embodiments, in the vacuum valve control device of the present invention, resilient deformation of the liquid level detecting diaphragm is quickly canceled. Therefore, it is possible to quickly return the vacuum valve from an open condition to a closed condition, and the smooth operation of the entire system can be guaranteed.

Furthermore, according to the present invention, the vacuum valve can be opened at an appropriate opening time in accordance with vacuum pressure in the vacuum discharge pipe, and a ratio of air to liquid in the pipe line can be maintained in a predetermined range. Therefore, the vacuum type liquid collecting/transporting apparatus can be stably operated.

Moreover, according to the present invention, in the vacuum valve, the valve opening and closing stability can be maintained over a long period of time, and the labor necessary for maintenance can be greatly reduced.

What is claimed is:

1. A vacuum valve control device for controlling operation of a vacuum valve by opening and closing a pipe-shaped connecting section connecting a vacuum discharge pipe in a vacuum condition with the suction pipe for sucking liquid-like materials from a tank, said vacuum valve control device comprising:

a liquid level detecting pipe whose inside pressure fluctuates in accordance with a liquid level in said tank;

a pressure adjusting chamber communicating with said liquid level detecting pipe;

a freely movable diaphragm that is not secured at its peripheral edge disposed between said liquid level detecting pipe and said pressure adjusting chamber;

a liquid level detecting diaphragm resiliently deformable in response to a pressure increase in said pressure adjusting chamber being transmitted thereto via a through-hole;

a detection valve controlled by deformation of said liquid level detecting diaphragm;

a changeover valve controlled by said detection valve to selectively supply a vacuum pressure and an atmospheric pressure to said valve, wherein said damping diaphragm has at least one small through-hole so that said damping diaphragm does not resiliently deform when the pressure in said liquid level detecting pipe is gradually increased, wherein said damping diaphragm resiliently deforms due to decompression of said pressure adjusting chamber to close said through-hole, wherein said damping diaphragm quickly releases the pressure around the non-secured peripheral edge thereof to said liquid level detecting pipe when the pressure in said pressure adjusting chamber is rapidly increased to quickly close as said liquid level in said tank reaches a substantially empty condition.

2. A vacuum valve control device as claimed in claim 1, wherein a diameter of said through-hole is determined in such a manner that the area of said through-hole is less than ⅛ of a cross-section of said through-hole.

3. A vacuum valve having a vacuum valve control device for opening and closing a communicating section between a suction pipe communicating with a tank and vacuum discharge pipe communicating with a vacuum source, said vacuum valve comprising:

a valve body for opening and closing said communicating section;

a valve operating chamber for accommodating a plunger connected with said valve body;

a closing force providing means for providing a closing force to said valve body via said valve operating chamber, wherein said vacuum valve control device selectively provides an opening force to said valve body via said valve operating chamber, said vacuum valve control device comprising:

a liquid level detecting diaphragm which resiliently deforms in response to a liquid level in said tank;

a second plunger directly driven by said liquid level detecting diaphragm;

a detecting valve being drive by said second plunger;

a pressure control chamber maintaining a vacuum pressure from a vacuum passage applied thereto when said detecting valve is driven by said second plunger and maintaining an atmospheric pressure from an atmospheric passage applied thereto when said detecting valve is not driven by said second plunger;

a changeover valve which operates to connect a vacuum pressure from said vacuum passage to said valve operating chamber when said pressure control chamber maintains a vacuum pressure, thereby providing said opening force upon said valve body; and an opening time adjusting valve for variably releasing a vacuum force introduced into said pressure control chamber, said opening time adjusting valve having an air hole for releasing said vacuum and being compressively deformed to change the section area of said air hole so that an opening time for said vacuum valve can be controlled according to the varying pressure of said pressure control chamber.

4. A vacuum valve control device as claimed in claim 3, wherein said opening time adjusting valve is formed of a cylindrical elastic body.

5. A vacuum valve having a vacuum valve control device for by opening and closing a communicating section between a suction pipe communicating with a tank and a vacuum discharge pipe communicating with a vacuum source, said vacuum valve comprising:

a valve body for opening and closing said communicating section;

a valve operating chamber for accommodating a plunger connected with said valve body;

a closing force providing means for providing a closing force to said valve body via said valve operating chamber, wherein said vacuum valve control device for selectively provides an opening force to said valve body via said valve operating chamber, said vacuum valve control device comprising:

a liquid level detecting diaphragm which resiliently deforms in response to a liquid level in said tank;

a second plunger directly driven by said liquid level detecting diaphragm;

a detecting valve being driven by said second plunger;

a pressure control chamber maintaining a vacuum pressure from a vacuum passage applied thereto when said detecting valve is driven by said second plunger and maintaining an atmospheric pressure from an atmospheric passage applied thereto when said detecting valve is not driven by said second plunger;

a changeover valve which operates to connect a vacuum pressure from said vacuum passage to said valve operating chamber when said pressure control chamber maintains a vacuum pressure, thereby providing said opening force upon said valve body; and an opening time adjusting valve for releasing a vacuum force introduced into said pressure control chamber, the opening time of said opening time adjusting valve being automatically controlled in accordance with a degree of vacuum in said vacuum discharge pipe.

6. A vacuum valve control device as claimed in claim 5, wherein said opening time adjusting valve comprises a needle valve having a diaphragm provided in a passage connecting the inside and outside of the pressure control chamber, wherein a valve lift of said needle valve being adjustable by applying vacuum pressure from said vacuum discharge pipe to said diaphragm, and wherein the valve lift of said needle valve being increased when the vacuum pressure is high, and the valve lift of said needle valve being decreased when the vacuum pressure is low.

7. A vacuum valve control device as claimed in claim 5, wherein said opening time adjusting valve comprises:

a duckbill valve provided in a passage connecting the inside and outside of said pressure control chamber, a valve lift of said duckbill valve being adjustable by applying vacuum pressure from a side of said pressure control chamber to an outer surface of said duckbill valve, the valve lift of said duckbill valve being increased when the vacuum pressure is high, and the valve lift of said duckbill valve being decreased when the vacuum pressure is low.

8. A vacuum valve control device as claimed in claim 5, wherein said opening time adjusting valve comprises:

an orifice valve provided in a passage connecting the inside and outside of said pressure control chamber, wherein a valve lift of said orifice valve being adjustable by applying vacuum pressure from a side of said pressure control chamber to an outer surface of said orifice valve, the valve lift of said orifice valve being increased when the vacuum pressure is high, and the valve lift of said orifice valve being decreased when the vacuum pressure is low.

9. A vacuum valve control device for controlling operation of a vacuum valve by opening and closing a pipe-shaped connecting section which connects a vacuum discharge pipe in a vacuum condition with a suction pipe for sucking liquid-like materials from a tank, said vacuum valve control device comprising:

a liquid level detecting pipe whose inside pressure fluctuates in accordance with a liquid level in said tank;

a pressure adjusting chamber communicating with said liquid level detecting pipe;

a free-standing damping diaphragm disposed between said liquid level detecting pipe and said pressure adjusting chamber, said damping diaphragm being situated without attachment upon a support portion such that a groove is formed around the periphery of said support portion to quickly release the pressure within the pressure adjusting chamber around the peripheral edge of the damping diaphragm and to quickly close the damping diaphragm in response to a decrease of the pressure inside said liquid level detecting pipe;

a liquid level detecting diaphragm being resiliently deformed in response to a pressure increase in said pressure adjusting chamber;

a detection valve controlled by deformation of said liquid level detecting diaphragm; and a changeover valve being controlled by said detection valve to selectively apply a vacuum pressure and an atmospheric pressure to said vacuum valve.

10. A vacuum valve control device as claimed in claim 9, wherein said free-standing damping diaphragm, said support portion, and said groove formed around the periphery of said support portion have an annular shape.

11. A vacuum valve control device as claimed in claim 9 wherein said free-standing damping diaphragm further comprises one or more through-holes, wherein said through-holes prevent resilient deformation of said damping diaphragm when the pressure in said liquid level detecting pipe is gradually increased, wherein said damping diaphragm resiliently deforms by decompression of said pressure adjusting chamber to close said through-hole, wherein said damping diaphragm releases the pressure from its peripheral portion to the liquid level detecting pipe when the pressure in the pressure adjusting chamber increases substantially.

* * * * *